US010983539B2

(12) United States Patent
Tsuchie et al.

(10) Patent No.: US 10,983,539 B2
(45) Date of Patent: Apr. 20, 2021

(54) WORK MACHINE

(71) Applicant: HITACHI CONSTRUCTION MACHINERY CO., LTD., Tokyo (JP)

(72) Inventors: Yoshiyuki Tsuchie, Tokyo (JP); Hiroshi Sakamoto, Tsuchiura (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 387 days.

(21) Appl. No.: 16/306,908

(22) PCT Filed: Jun. 1, 2017

(86) PCT No.: PCT/JP2017/020523
§ 371 (c)(1),
(2) Date: Dec. 4, 2018

(87) PCT Pub. No.: WO2017/213027
PCT Pub. Date: Dec. 14, 2017

(65) Prior Publication Data
US 2021/0018942 A1 Jan. 21, 2021

(30) Foreign Application Priority Data
Jun. 7, 2016 (JP) .............................. JP2016-113779

(51) Int. Cl.
*F16K 31/02* (2006.01)
*G05D 16/08* (2006.01)
(Continued)

(52) U.S. Cl.
CPC ............. *G05D 16/08* (2013.01); *F16K 13/10* (2013.01); *E02F 9/20* (2013.01); *E02F 9/2004* (2013.01);
(Continued)

(58) Field of Classification Search
CPC ....... G05D 16/08; F16K 13/10; E02F 9/2004; E02F 9/20; E02F 9/2025; E02F 9/2221; E02F 9/2267; F15B 11/08
(Continued)

(56) References Cited

U.S. PATENT DOCUMENTS

| 5,560,387 A * | 10/1996 | Devier ................. E02F 9/2025 137/1 |
| 2006/0230754 A1* | 10/2006 | Foster .................... A01B 67/00 60/446 |

(Continued)

FOREIGN PATENT DOCUMENTS

| JP | 01-97729 A | 4/1989 |
| JP | 11-287207 A | 10/1999 |

(Continued)

OTHER PUBLICATIONS

International Search Report of PCT/JP2017/020523 dated Jul. 18, 2017.

*Primary Examiner* — Minh Q Le
(74) *Attorney, Agent, or Firm* — Mattingly & Malur, PC

(57) ABSTRACT

A work machine includes an operation intention determining section that determines whether or not an operator has an intention of operating an operation member based on a state change of the operation member, a current supply section that supplies a current to a solenoid valve device based on an operation of the operation member, and a current control section that permits supply of a standby current from the current supply section to the solenoid valve device when it has been determined by an operation position determining section that the operation member is disposed within a preset neutral range and it has been determined by the operation intention determining section that there is an intention of operating the operation member, the standby current being lower than a current of the time when a hydraulic actuator starts driving.

6 Claims, 12 Drawing Sheets

(51) Int. Cl.
*F16K 13/10* (2006.01)
*E02F 9/20* (2006.01)
*E02F 9/22* (2006.01)
*F15B 11/08* (2006.01)

(52) U.S. Cl.
CPC .......... *E02F 9/2025* (2013.01); *E02F 9/2221* (2013.01); *E02F 9/2267* (2013.01); *F15B 11/08* (2013.01)

(58) Field of Classification Search
USPC .......... 137/487.5; 251/25; 91/482, 483, 244, 91/247, 248, 294, 308, 369.4, 527, 529, 91/459, 461; 701/50, 42, 30.9, 31.1
See application file for complete search history.

(56) References Cited

U.S. PATENT DOCUMENTS

| | | | |
|---|---|---|---|
| 2011/0071739 | A1 | 3/2011 | Sano et al. |
| 2014/0130487 | A1* | 5/2014 | Akiyama ............... E02F 9/2228 60/431 |
| 2014/0184122 | A1* | 7/2014 | Ogawa ..................... H02P 3/18 318/461 |
| 2016/0281323 | A1* | 9/2016 | Imaizumi ............... E02F 9/0841 |
| 2017/0073924 | A1* | 3/2017 | Garramone ............. E02F 3/283 |
| 2018/0094406 | A1* | 4/2018 | Kim ....................... E02F 9/2292 |
| 2018/0119391 | A1* | 5/2018 | Kondo ................ F02D 41/3005 |
| 2018/0202127 | A1* | 7/2018 | Murota ..................... E02F 3/32 |
| 2018/0223500 | A1* | 8/2018 | Tsuchie .................. E02F 3/437 |
| 2019/0106861 | A1* | 4/2019 | Izumi ..................... E02F 3/425 |
| 2019/0186106 | A1* | 6/2019 | Ogawa ..................... F15B 21/14 |
| 2019/0249391 | A1* | 8/2019 | Kikuchi .................. E02F 9/26 |
| 2019/0271333 | A1* | 9/2019 | Kondo .................. E02F 9/2242 |
| 2019/0352883 | A1* | 11/2019 | Nishiguchi ........... E02F 9/2285 |
| 2019/0360172 | A1* | 11/2019 | Yamamoto ............ E02F 9/2296 |
| 2020/0198700 | A1* | 6/2020 | Benck .................... B66C 13/42 |
| 2020/0318319 | A1* | 10/2020 | Shimizu ................ F15B 21/082 |
| 2020/0407947 | A1* | 12/2020 | Tanaka .................. E02F 9/261 |
| 2021/0040705 | A1* | 2/2021 | Ishihara ................ E02F 9/2203 |

FOREIGN PATENT DOCUMENTS

| | | |
|---|---|---|
| JP | 2010-248867 A | 11/2010 |
| JP | 2011-006862 A | 1/2011 |
| JP | 2013-014981 A | 1/2013 |

\* cited by examiner

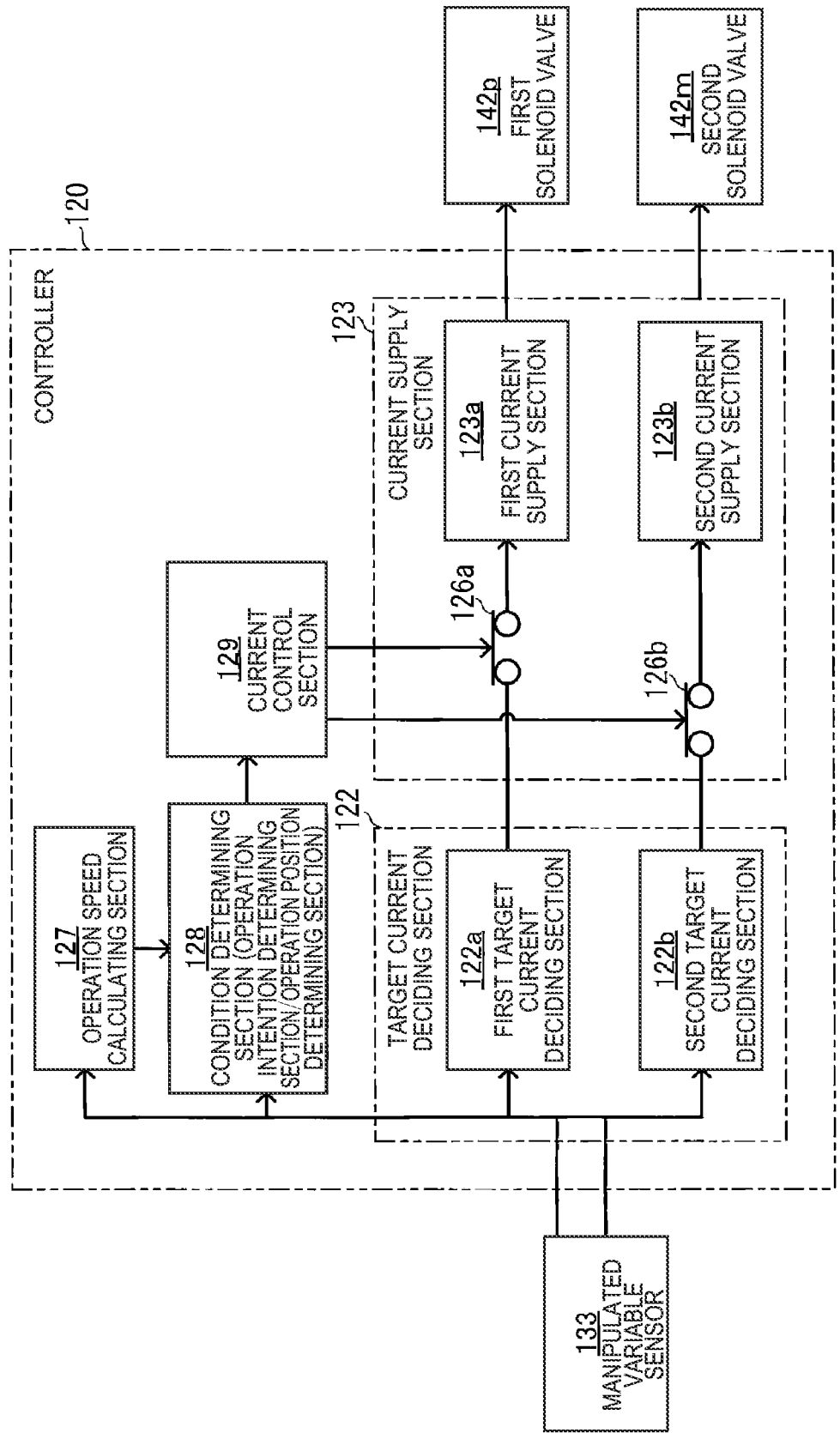

FIG. 6

| MANIPULATED ANGLE θ | NEGATIVE | | | NEUTRAL | | | POSITIVE | | |
|---|---|---|---|---|---|---|---|---|---|
| OPERATION SPEED ω | NEGATIVE | STOP | POSITIVE | NEGATIVE | STOP | POSITIVE | NEGATIVE | STOP | POSITIVE |
| CURRENT SUPPLY — FIRST SOLENOID VALVE(DUMP) | TURN OFF | | | TURN OFF | | | TURN ON | | |
| CURRENT SUPPLY — SECOND SOLENOID VALVE(CROWD) | TURN ON | | | | | | TURN OFF | | |

SECOND SOLENOID VALVE VALIDATION CONDITION SATISFIED: NEGATIVE manipulated angle FIRST SOLENOID VALVE VALIDATION CONDITION SATISFIED: POSITIVE manipulated angle

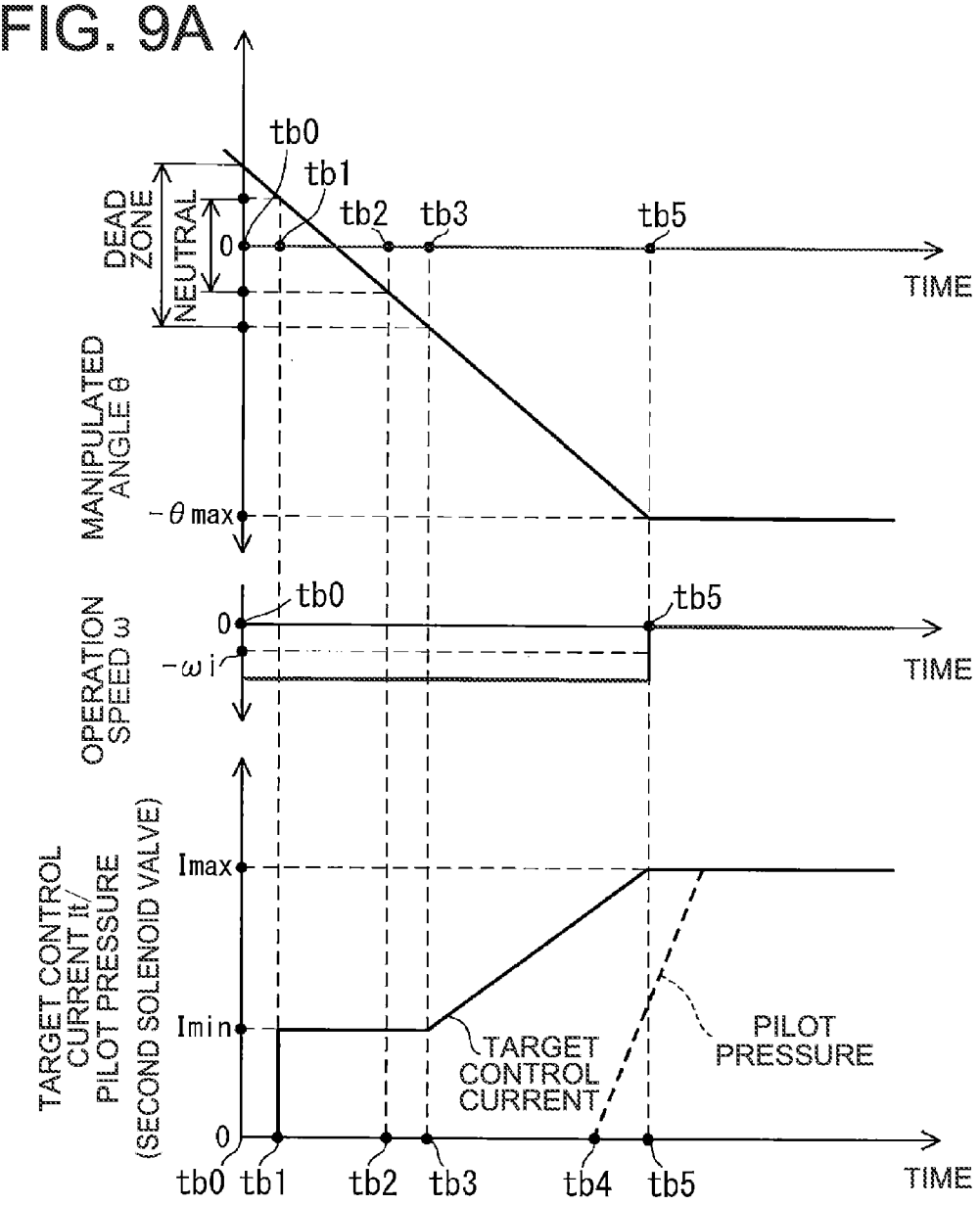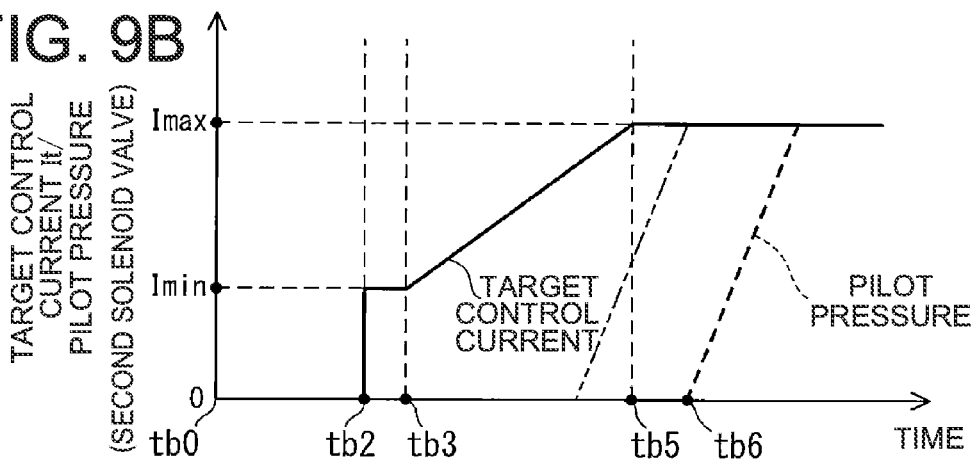

WORK MACHINE

TECHNICAL FIELD

The present invention relates to a work machine.

BACKGROUND ART

There is known a drive control device of a hydraulic machine which includes a neutral position detection means and an forbidding means, the neutral position detection means detecting the neutral position of an operating lever, the forbidding means forbidding transmission of a signal between a control main body of a control means and a control valve when an output signal of the neutral position detection means is inputted and the operating lever is at the neutral position (refer to Patent Literature 1). According to the drive control device described in Patent Literature 1, even when a failure or inclusion of noise accompanying working occurs in an electric device including the control main body of the control means and an error signal is generated, the error signal is not transmitted to the control valve, and the control valve can be restored to the neutral position.

CITATION LIST

Patent Literature

PATENT LITERATURE 1: JP-A No. H1-97729

SUMMARY OF INVENTION

Technical Problem

However, according to the drive control device described in Patent Literature 1, there is a problem that, when an operating lever is operated in order to operate the hydraulic machine, delay of the response of the control valve is large by the influence of friction of a spool of the control valve.

Solution to Problem

A work machine according to an aspect of the present invention is a work machine including a hydraulic pump, a hydraulic actuator that is driven by a pressure oil discharged from the hydraulic pump, a solenoid valve device that controls a flow of a pressure oil supplied from the hydraulic pump to the hydraulic actuator, an operation member through which the solenoid valve device is operated, and an operation position determining section that determines whether or not the operation member is disposed within a preset neutral range. The work machine further comprises: an operation intention determining section that determines whether or not an operator intends to operate the operation member based on a state change of the operation member; a current supplying section that supplies a current to the solenoid valve device based on an operation of the operation member; and a current control section that allows a standby current, that is lower than a current of the time when the hydraulic actuator starts driving, to be supplied from the current supplying section to the solenoid valve device when the operation position determining section determines that the operation member is disposed within the neutral range and the operation intention determining section determines that there is an intention to operate the operation member.

Advantageous Effects of Invention

According to the present invention, the responsiveness of a solenoid valve device to an operation can be improved.

BRIEF DESCRIPTION OF DRAWINGS

FIG. 4 is a block diagram that shows a configuration of a controller according to the first embodiment of the present invention.

FIG. 6 is a drawing that explains a condition for determining whether or not a current is to be supplied to the solenoid valve.

FIG. 9A is a time chart that shows a motion of the controller according to the present embodiment FIG. 9B is a time chart that shows a motion of a controller according to a comparative example.

DESCRIPTION OF EMBODIMENTS

First Embodiment

Figure 1:
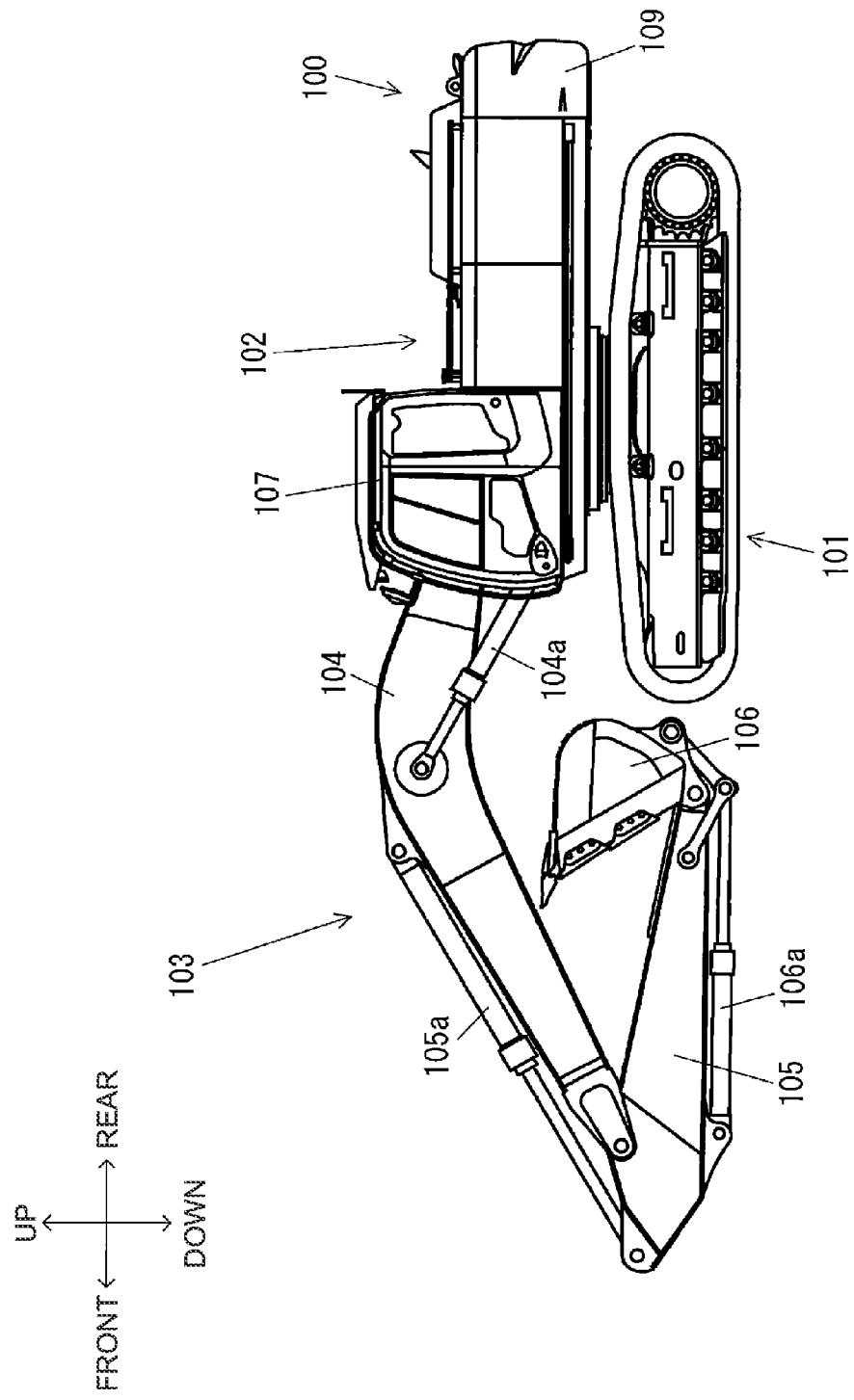
FIG. 1 is a side view of a hydraulic excavator.

FIG. 1 is a side view of a hydraulic excavator (back hoe) 100 that is an example of the work machine. Also, for the sake of convenience of the explanation, front/rear and up/down directions are defined as shown in FIG. 1. As shown in FIG. 1, the hydraulic excavator 100 includes an undercarriage 101 and an upperstructure 102 that is swingably mounted on the undercarriage 101. The undercarriage 101 travels by driving a pair of left and right crawlers by traveling motors.

A cab 107 is arranged on the left side of the front part of the upperstructure 102, and an engine chamber is arranged at the rear part of the cab 107. In the engine chamber, an engine that is a power source, a hydraulic device, and the like are stored. To the rear part of the engine chamber, a counterweight 109 for balancing the machine body at the time of working is attached. On the right side of the front part of the upperstructure 102, a front working device 103 is arranged.

The front working device 103 includes plural front members namely a boom 104, an arm 105, and a bucket 106. With respect to the boom 104, the base end section is rotatably attached to the front part of the upperstructure 102. With respect to the arm 105, one end thereof is rotatably attached to the distal end of the boom 104. The boom 104 and the arm 105 are driven by a boom cylinder 104a and an arm cylinder 105a respectively to rotate. The bucket 106 is attached to the arm 105 so as to be rotatable in the vertical direction at the distal end of the arm 105, and is driven by a bucket cylinder 106a to rotate.

Figure 2:
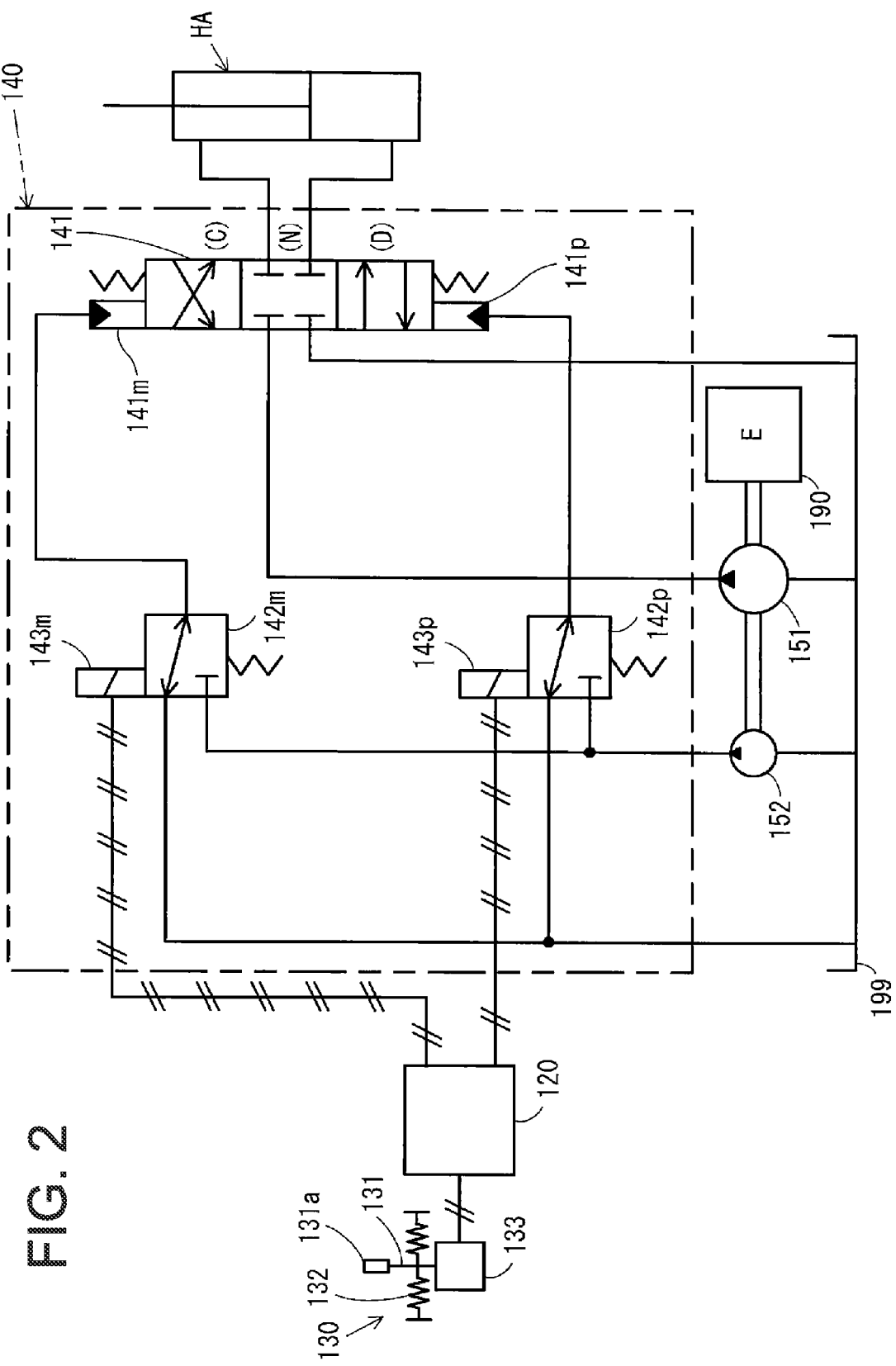
FIG. 2 is a drawing that shows a schematic configuration of the hydraulic excavator according to the first embodiment of the present invention.

FIG. 2 is a drawing that shows a schematic configuration of the hydraulic excavator 100 according to the first embodiment of the present invention. In FIG. 2, illustration of a relief valve that defines the maximum pressure of the hydraulic circuit is omitted. In the hydraulic circuit included in the hydraulic excavator 100, there are arranged plural hydraulic actuators such as the boom cylinder 104a, the arm cylinder 105a, the bucket cylinder 106a, a hydraulic motor for swinging, and so on, a solenoid valve device that controls a flow of the pressure oil supplied to these hydraulic actuators, and so on. Hereinafter, for the sake of convenience of the explanation, out of the plural hydraulic actuators, one hydraulic actuator HA (the bucket cylinder 106a for example) is representatively shown, and illustration is omitted with respect to the other hydraulic actuators. That is to say, FIG. 2 can be deemed to be a drawing that shows a configuration for driving one hydraulic actuator (the bucket cylinder 106a for example).

The hydraulic excavator 100 includes a controller 120, an engine 190, a main pump 151, a pilot pump 152, a solenoid valve device 140, and an operation device 130. The controller 120 is configured so as to include an arithmetic processing unit that includes a CPU, a ROM, a RAM, other peripheral circuits, and so on, the ROM and the RAM being storage devices, and executes control of each portion of the hydraulic excavator 100.

To the controller 120, a manipulated variable sensor 133 is connected. The manipulated variable sensor 133 detects the rotation angle of an operating lever 131 of the operation device 130 as a manipulated angle (manipulated variable) θ, and outputs a signal corresponding to the manipulated angle θ to the controller 120. The manipulated variable sensor 133 can be configured for example of a potentiometer that outputs a voltage corresponding to the rotation angle of the operating lever 131. The operation device 130 of an electric type operates the solenoid valve device 140 described below, and includes the operating lever 131, the manipulated variable sensor 133, and a restoring mechanism that includes a return spring 132.

The operating lever 131 is a rotatable bar-like member, and a grip part 131a gripped by an operator is arranged at the distal end. The return spring 132 is connected to the operating lever 131, and the operating lever 131 is resiliently energized toward the neutral position by the return spring 132. Also, the restoring mechanism also has a function as a reaction force imparting device that imparts an operation reaction force to the operating lever 131. Inside the cab 107, plural operation devices 130 are disposed.

Figure 3A:
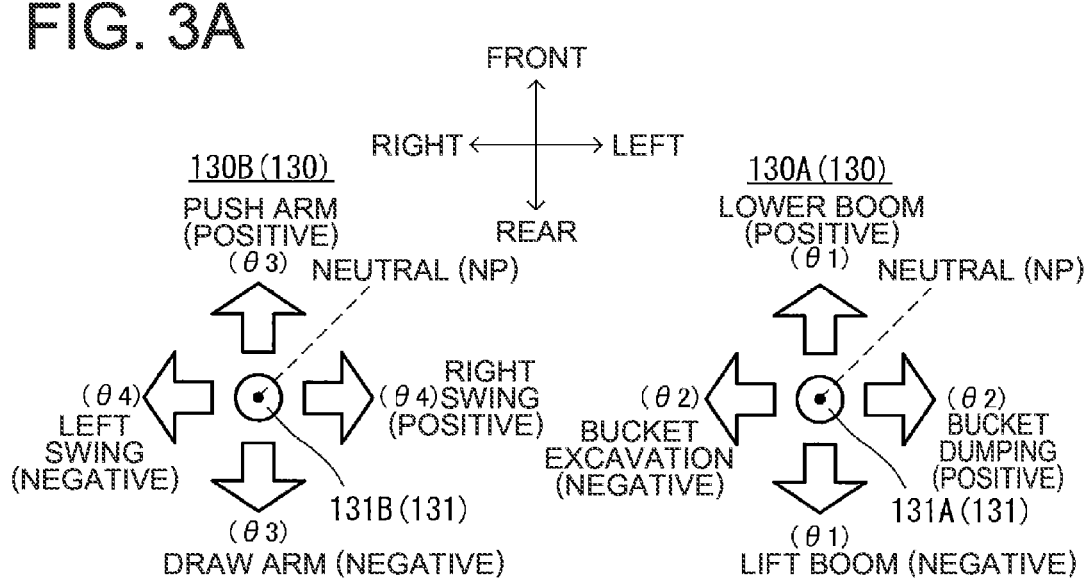
FIG. 3A is a drawing that explains a motion of the hydraulic excavator corresponding to the manipulated direction of an operating lever

FIG. 3A is a drawing that explains a motion of the hydraulic excavator 100 corresponding to the manipulated direction of the operating lever 131. Inside the cab 107, a right side operation device 130A positioned on the right side of the operator seat and a left side operation device 130B positioned on the left side of the operator seat are provided as the operation devices 130.

Figure 3B:
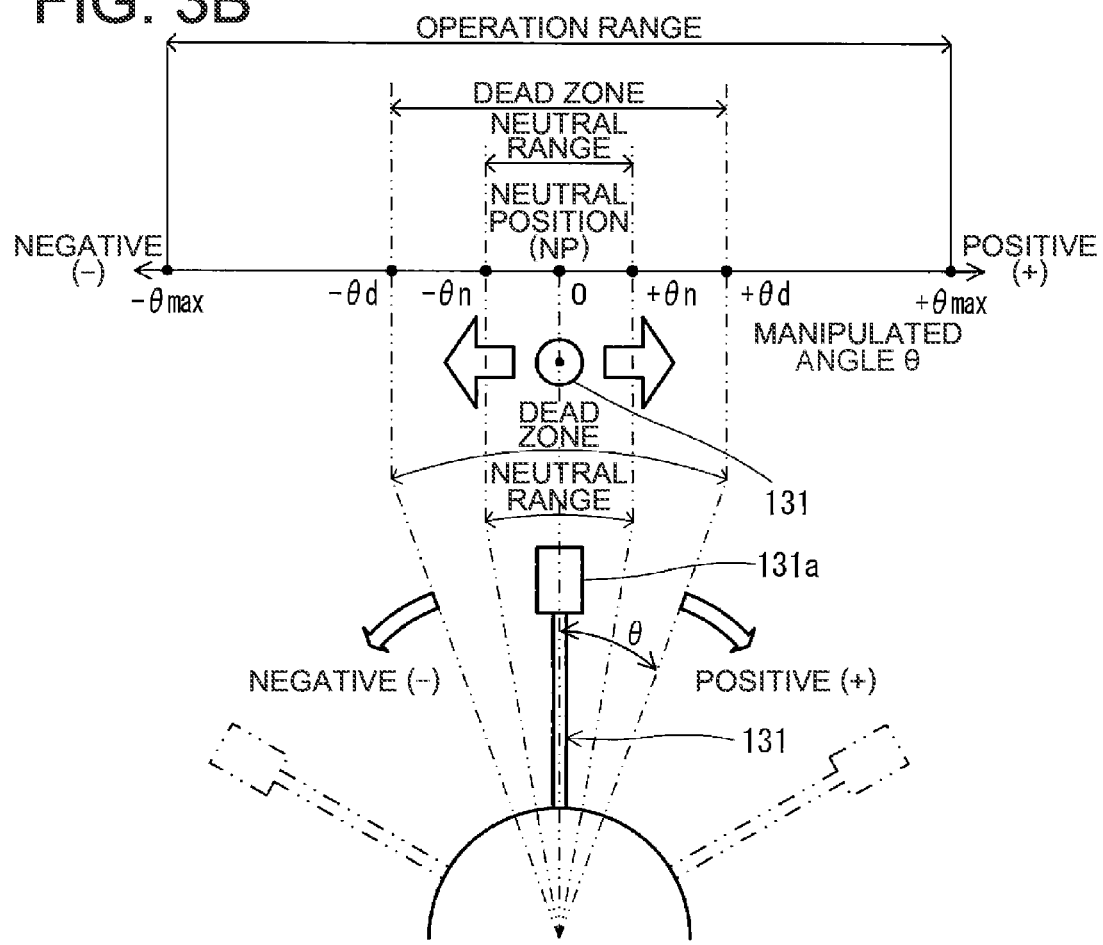
FIG. 3B is a drawing that explains the neutral range of the operating lever.

FIG. 3B is a drawing that explains the neutral range of the operating lever 131. As shown in FIG. 3B, the neutral position (NP) of the operating lever 131 is set to a position that divides the rotation range of the operating lever 131 into two. The manipulated angle θ of the operating lever 131 is equivalent to the tilting angle from the neutral position (NP).

In the present embodiment, the manipulated angle θ of the time when the operating lever 131 is positioned at the neutral position (NP) is set to 0°. The manipulated angle θ becomes large in the positive direction when the operating lever 131 is tilted to one side from the neutral position (NP). Also, the manipulated angle θ becomes large in the negative direction namely becomes less than 0° when the operating lever 131 is tilted to the other side from the neutral position (NP).

As shown in FIG. 3A, the right side operation device 130A is an operation device that operates the rotational motion of the boom 104 with respect to the upperstructure 102 and the rotational motion of the bucket 106 with respect to the arm 105. When the operating lever of the right side operation device 130A (will be hereinafter referred to as a right operating lever 131A) is tilted forward from the neutral position (NP), a positive manipulated angle (θ1) increases, and a boom lowering motion is executed. The boom lowering motion is a motion that the boom cylinder 104a contracts and the boom 104 rotates downward at a speed corresponding to the manipulated angle (θ1). When the right operating lever 131A is tilted rearward from the neutral position (NP), the negative manipulated angle (θ1) reduces, and a boom lifting motion is executed. The boom lifting motion is a motion that the boom cylinder 104a extends and the boom 104 rotates upward at a speed corresponding to the manipulated angle (θ1).

When the right operating lever 131A is tilted to the right from the neutral position (NP), a positive manipulated angle (θ2) increases, and a bucket dumping motion is executed. The dumping motion is a motion that the bucket cylinder 106a contracts and the bucket 106 rotates at a speed corresponding to the manipulated angle (θ2) so that the claw tip (distal end) of the bucket 106 departs from the belly surface of the arm 105 (rotates clockwise in FIG. 1). When the right operating lever 131A is tilted to the left from the neutral position (NP), the negative manipulated angle (θ2) reduces, and a bucket excavating motion (is also referred to as a bucket crowd motion) is executed. The bucket excavating motion is a motion that the bucket cylinder 106a extends and the bucket 106 rotates at a speed corresponding to the manipulated angle (θ2) so that the claw tip (distal end) of the bucket 106 approaches the belly surface of the arm 105 (rotates counterclockwise in FIG. 1).

An operating lever of the left side operation device 130B (will be hereinafter referred to as a left operating lever 131B) is an operation member that operates a rotation motion of the arm 105 with respect to the boom 104 and a swing motion of the upperstructure 102. When the left operating lever 131B is tilted forward from the neutral position (NP), a positive manipulated angle (θ3) increases, and an arm pushing motion (is also referred to as an arm stretching motion) is executed. The arm pushing motion is a motion that the arm cylinder 105a contracts, and the arm 105 rotates at a speed corresponding to the manipulated angle (θ3) to a direction in which the relative angle of the arm 105 is widened with respect to the boom 104 (rotates clockwise in FIG. 1). When the left operating lever 131B is tilted rearward from the neutral position (NP), the negative manipulated angle (θ3) reduces, and an arm drawing motion (is also referred to as an arm bending motion) is executed. The arm drawing motion is a motion that the arm cylinder 105a extends, and the arm 105 rotates at a speed corresponding to the manipulated angle (θ3) so as to fold the arm 105 to the boom 104 side (rotates counterclockwise in FIG. 1).

When the left operating lever 131B is tilted to the right from the neutral position (NP), a positive manipulated angle (θ4) increases, a swing motor (not illustrated) is driven, and the upperstructure 102 swings to the right at a speed corresponding to the manipulated angle (θ4). When the left operating lever 131B is tilted to the left from the neutral position (NP), the negative manipulated angle (θ4) reduces, the swing motor (not illustrated) is driven, and the upperstructure 102 swings to the left at a speed corresponding to the manipulated angle (θ4). Also, θ1, θ2, θ3, θ4 described above will be collectively referred to as θ.

When the right operating lever 131A is tilted to an oblique direction such as obliquely forward to the left from the neutral position (NP), the boom 104 and the bucket 106 can be operated complexly. When the left operating lever 131B is tilted to an oblique direction such as obliquely forward to the left from the neutral position (NP), the arm 105 and the upperstructure 102 can be operated complexly. Therefore, according to the hydraulic excavator 100 in the present embodiment, by operating the right operating lever 131A and the left operating lever 131B simultaneously, four operations at the maximum can be operated complexly.

As shown in FIG. 3B, a dead zone is an operation region where the hydraulic actuator HA corresponding to the operating lever 131 is not operated, and is arranged in order to prevent the hydraulic actuator HA from being driven sensitively only by that the operating lever 131 is tilted slightly from the neutral position (NP). The dead zone is set to a range of the manipulated angle of (−θd) or more and (+θd) or less, and is approximately 15 to 25% of the entire operation range for example. Also, θd is a positive number (θd>0).

The neutral range is an operation region that is preset within the dead zone, and is arranged to be used for determination of whether or not the control current is to be supplied to the solenoid valve device 140. The neutral range is set to a range of the manipulated angle of (−θn) or more and (+θn) or less, and is approximately 5 to 10% of the entire operation range for example. Also, θn is a positive number smaller than θd, and is an angle threshold that expresses the boundary of the neutral range (θn<θd). A first angle threshold (+θn) that is a positive angle threshold and a second angle threshold (−θn) that is a negative angle threshold are stored beforehand in the storage device of the controller 120.

To the controller 120, a signal corresponding to the manipulated angle θ (θ1, θ2, θ3, θ4) of the left operating lever 131B and the right operating lever 131A is inputted. The controller 120 detects the manipulated direction and the manipulated angle of the left operating lever 131B and the right operating lever 131A based on the signal of the manipulated angle θ from the manipulated variable sensor 133.

As shown in FIG. 2, the main pump 151 and the pilot pump 152 which are hydraulic pumps are driven by the engine 190, and discharge the hydraulic oil in the inside of a tank 199 as a pressure oil. The hydraulic actuator HA is driven by the pressure oil that is discharged from the main pump 151. The solenoid valve device 140 includes a direction control valve 141 of a hydraulic pilot type and two solenoid proportional pressure reducing valves (will be hereinafter referred to as a first solenoid valve 142p and a second solenoid valve 142m), the direction control valve 141 controlling a flow of the pressure oil supplied from the main pump 151 to the hydraulic actuator HA, the two solenoid proportional pressure reducing valves controlling the motion of the direction control valve 141.

The first solenoid valve 142p is connected to the pilot pump 152, and generates a pilot pressure that is supplied to a first pilot section 141p of the direction control valve 141 when the operating lever 131 is operated so as to rotate to the positive side of the outside of the neutral range. The second solenoid valve 142m is connected to the pilot pump 152, and generates a pilot pressure that is supplied to a second pilot section 141m of the direction control valve 141 when the operating lever 131 is operated so as to rotate to the negative side of the outside of the neutral range.

Hereinafter, with a presumption that the hydraulic actuator HA of FIG. 2 is the bucket cylinder 106a, explanation will be made with driving of the bucket 106 being represented. The controller 120 outputs the control current (magnetizing current) to solenoids 143p, 143m of the solenoid valves 142p, 142m according to the manipulated direction and the manipulated angle of the operating lever 131. When the operating lever 131 is operated to the positive direction (bucket dumping direction), the decompression degree of the first solenoid valve 142p is set by the control current that is supplied from the controller 120 according to the manipulated angle (θ). When the operating lever 131 is operated to the negative direction (bucket excavating direction), the decompression degree of the second solenoid valve 142m is set by the control current that is supplied from the controller 120 according to the manipulated angle (θ).

The opening characteristic of the solenoid valves 142p, 142m is set so that the decompression degree reduces accompanying increase of the control current that is inputted to the solenoid valves 143p, 143m namely so that the secondary pressure (pilot pressure) increases accompanying increase of the control current.

When a pilot pressure generated by the solenoid valve 142p is applied to the first pilot section 141p of the direction control valve 141, a spool of the direction control valve 141 shifts to the position (D) side, and the hydraulic actuator HA (the bucket cylinder 106a) contracts. When a pilot pressure generated by the solenoid valve 142m is applied to the second pilot section 141m of the direction control valve 141, the spool of the direction control valve 141 shifts to the position (C) side, and the hydraulic actuator HA (the bucket cylinder 106a) extends.

When each of the first pilot section 141p and the second pilot section 141m of the direction control valve 141 is connected to the tank 199 through each of the first solenoid valve 142p and the second solenoid valve 142m, the spool of the direction control valve 141 shifts to the neutral position (N).

FIG. 4 is a block diagram that shows a configuration of the controller 120 according to the first embodiment of the present invention. The controller 120 includes a target current deciding section 122, a current supply section 123, an operation speed calculating section 127, a condition determining section 128, and a current control section 129. To the controller 120, a power-supply device not illustrated is connected. The current supply section 123 includes a first current supply section 123a that supplies a current to the solenoid 143p of the first solenoid valve 142p that configures the solenoid valve device 140 when the operating lever 131 is operated so as to rotate to the positive side. The current supply section 123 includes a second current supply section 123b that supplies a current to the solenoid 143m of the second solenoid valve 142m that configures the solenoid valve device 140 when the operating lever 131 is operated so as to rotate to the negative side. The current supply section 123 adjusts the magnitude of the control current based on the target value of the control current that is set by the target current deciding section 122 described below, and supplies the control current to each of the solenoids 143p, 143m. Also, when a signal corresponding to the target value of the control current decided by the target current deciding section 122 described below has been shut-off by switches 126a, 126b, the current supply section 123 does not supply a current to the solenoid valves 142p, 142m.

The target current deciding section 122 decides the target value of the control current that is supplied from the current supply section 123 to the solenoids 143p, 143m of the solenoid valves 142p, 142m based on the manipulated angle θ of the operating lever 131 detected by the manipulated variable sensor 133. The target current deciding section 122 includes a first target current deciding section 122a and a second target current deciding section 122b.

Figure 5A:
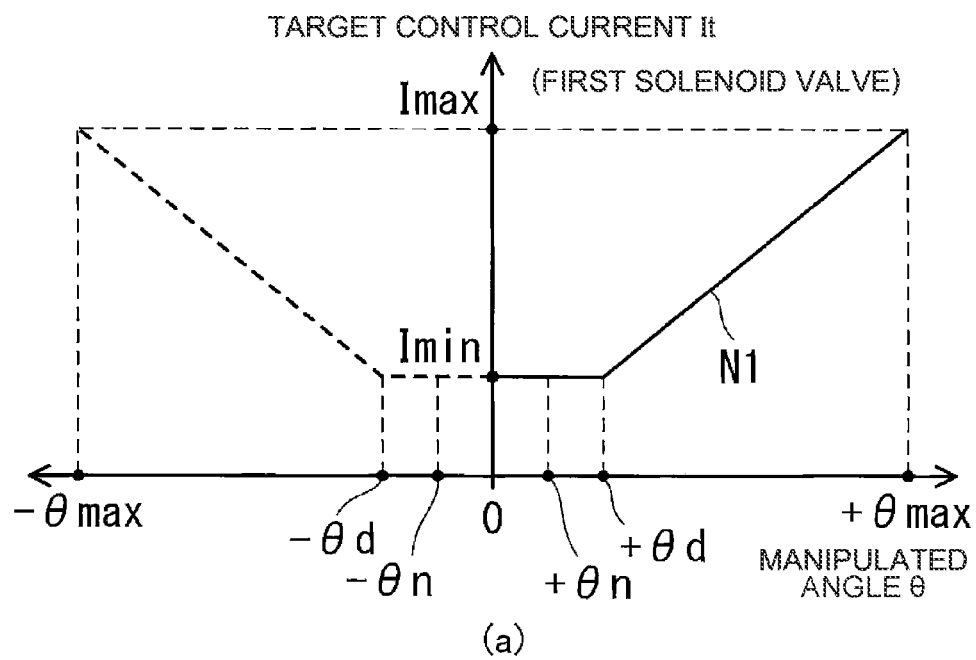
FIG. 5A is a drawing that shows the relation between the manipulated angle θ of the operating lever and the target value of the control current outputted to the first solenoid valve (refer to the solid line)
Figure 5B:
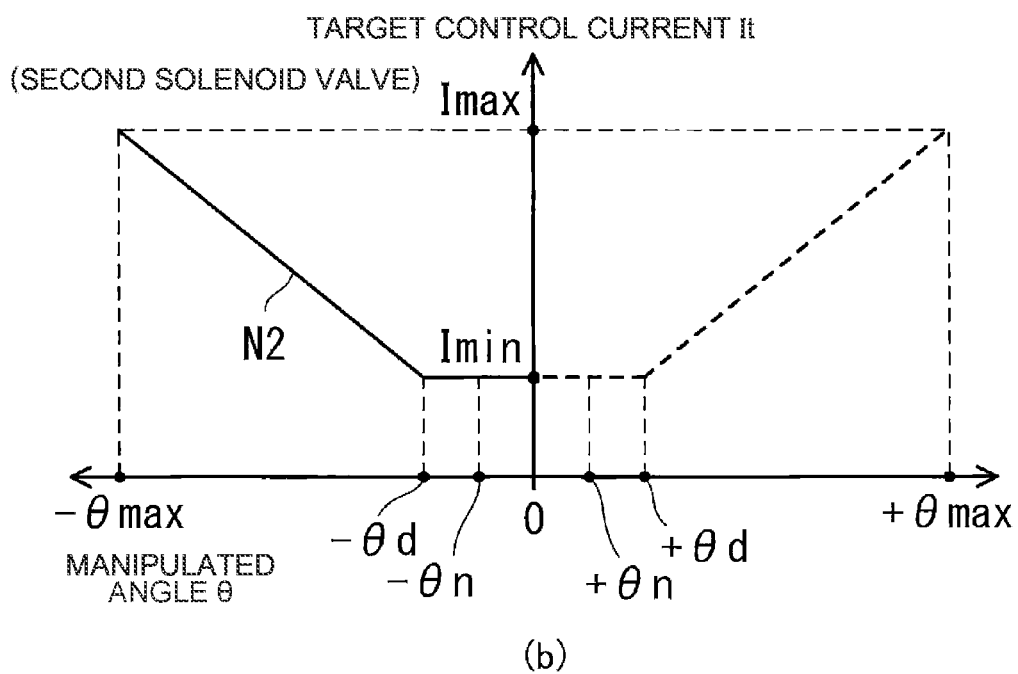
FIG. 5B is a drawing that shows the relation between the manipulated angle θ of the operating lever and the target value of the control current outputted to the second solenoid valve (refer to the solid line).

FIG. 5A is a drawing that shows the relation between the manipulated angle θ of the operating lever 131 and the target value of the control current outputted to the first solenoid valve 142p (refer to the solid line), and FIG. 5B is a drawing that shows the relation between the manipulated angle θ of the operating lever 131 and the target value of the control current outputted to the second solenoid valve 142m (refer to the solid line). In the storage device of the controller 120, a characteristic N1 shown in FIG. 5A and a characteristic N2 shown in FIG. 5B are stored in a look-up table form.

The first target current deciding section 122a refers to the table of the characteristic N1 shown by the solid line of FIG. 5A, and sets a target value of the control current (target control current It) outputted to the solenoid 143p of the first solenoid valve 142p based on the manipulated angle θ detected by the manipulated variable sensor 133. When the manipulated angle θ of the operating lever 131 is positioned in the dead zone of 0 or more and a dead zone first threshold (+θd) or less, the target control current It is set to a minimum current Imin. In an operation zone where the manipulated angle θ is larger than the dead zone first threshold (+θd) and a positive side maximum manipulated angle (+θmax) or less, as the manipulated angle θ increases, the target control current It increases linearly. When the manipulated angle θ of the operating lever 131 is the positive side maximum manipulated angle (+θmax), the target control current It is set to a maximum current Imax.

In a similar manner, the second target current deciding section 122b refers to the table of the characteristic N2 shown by the solid line of FIG. 5B, and sets the target value of the control current (target control current It) outputted to the solenoid 143m of the second solenoid valve 142m based on the manipulated angle θ detected by the manipulated variable sensor 133. When the manipulated angle θ of the operating lever 131 is positioned in the dead zone of 0 or less and a dead zone second threshold (−θd) or more, the target control current It is set to the minimum current Imin. In an operation zone where the manipulated angle θ is less than the dead zone second threshold (−θd) and a negative side maximum manipulated angle (−θmax) or more, as the manipulated angle θ reduces namely as the absolute value |θ| of the manipulated angle θ increases, the target control current It increases linearly. When the manipulated angle θ of the operating lever 131 is the negative side maximum manipulated angle (−θmax), the target control current It is set to the maximum current Imax.

The maximum current Imax is a target value for minimizing the decompression degree of the solenoid valves 142p, 142m. The minimum current Imin is a target value for making the solenoid valve device 140 supply a standby current when the operating lever 131 is disposed within the neutral range. Hereinafter, the minimum current Imin will be also referred to as the standby current Imin.

The standby current Imin is a minute current of approximately 10 mA to 400 mA for example, and is a current lower than a current of the time when the hydraulic actuator HA starts driving, or in other words, a current of the time when the spool of the direction control valve 141 starts a motion. Also, the standby current is applied with dither at a predetermined frequency in the current supply section 123. Therefore, when the standby current is supplied to the solenoids 143p, 143m of the solenoid valves 142p, 142m, since the spool of the solenoid valves 142p, 142m is slightly vibrated, friction of a sliding part is reduced, and a state of easy starting is effected.

The operation speed calculating section 127 shown in FIG. 4 calculates the operation speed (angular velocity) ω of the operating lever 131 based on the manipulated angle θ of the operating lever 131 detected by the manipulated variable sensor 133. The operation speed calculating section 127 repeats calculation of the operation speed ω at every predetermined control period (approximately 1 ms to 10 ms for example). The operation speed ω is calculated by dividing the difference Δθ (=θb−θa) of the manipulated angle θb detected at the control period of this time and the manipulated angle θa detected before one control period by the time Δt that corresponds to one control period (ω=Δθ/Δt). In other words, the operation speed calculating section 127 calculates the operation speed ω that is the temporal change rate of the manipulated angle θ by temporal differentiation of the manipulated angle θ.

The condition determining section 128 determines whether or not a first solenoid valve validation condition has been satisfied and whether or not a second solenoid valve validation condition has been satisfied based on the operation speed ω calculated by the operation speed calculating section 127 and the manipulated angle θ detected by the manipulated variable sensor 133. FIG. 6 is a drawing that explains a condition for determining whether or not a current is to be supplied to the solenoid valves 142p, 142m. The condition determining section 128 has a function as an operation intention determining section that determines whether or not the operator has an intention of operating the operating lever 131 based on the operation speed ω that is the temporal change rate of the manipulated angle θ of the operating lever 131. Also, the condition determining section 128 has a function as an operation position determining section that determines whether or not the operating lever 131 is disposed within the preset neutral range based on the manipulated angle θ of the operating lever 131. Hereinafter, the condition determining section 128 will be explained in detail.

When the operating lever 131 is disposed on the positive side of the outside of the neutral range, the condition determining section 128 determines that the first solenoid valve validation condition has been satisfied presuming that use of the first solenoid valve 142p has been confirmed. When the manipulated angle θ of the operating lever 131 is larger than the first angle threshold (+θn), the condition determining section 128 determines that the operating lever 131 has been disposed on the positive side of the outside of the neutral range.

When it has been determined that the operating lever 131 is disposed within the neutral range and there is an intention of operating the operating lever 131 to the bucket dumping direction (the positive side), the condition determining section 128 determines that the first solenoid valve validation condition has been satisfied presuming use of the first solenoid valve 142*p*. When the absolute value |θ| of the manipulated angle θ of the operating lever 131 is the first angle threshold (+θn) or less, the condition determining section 128 determines that the operating lever 131 has been disposed within the neutral range. When the operation speed ω of the operating lever 131 is a first speed threshold (+ωi) or above, the condition determining section 128 determines that there is an intention of operating the operating lever 131 to the bucket dumping direction (the positive side).

When the operating lever 131 is disposed on the negative side of the outside of the neutral range, the condition determining section 128 determines that the second solenoid valve validation condition has been satisfied presuming that use of the second solenoid valve 142*m* has been confirmed. When the manipulated angle θ of the operating lever 131 is less than the second angle threshold (−θn), the condition determining section 128 determines that the operating lever 131 has been disposed on the negative side of the outside of the neutral range.

When it has been determined that the operating lever 131 is disposed within the neutral range and there is an intention of operating the operating lever 131 to the bucket excavating direction (the negative side), the condition determining section 128 determines that the second solenoid valve validation condition has been satisfied presuming use of the second solenoid valve 142*m*. When the operation speed ω of the operating lever 131 is a second speed threshold (−ωi) or below, the condition determining section 128 determines that there is an intention of operating the operating lever 131 to the bucket excavating direction (the negative side).

When it has been determined that the operating lever 131 is disposed within the neutral range and that there is no intention of operating the operating lever 131, the condition determining section 128 determines that neither of the first solenoid valve validation condition nor the second solenoid valve validation condition has been satisfied. When the operation speed ω of the operating lever 131 is higher than the second speed threshold (−ωi) and lower than the first speed threshold (+ωi), the condition determining section 128 determines that there is no intention of operating the operating lever 131.

The first speed threshold (+ωi) that is a positive speed threshold and the second speed threshold (−ωi) that is a negative speed threshold are stored in the storage device of the controller 120 beforehand. Also, ωi is a positive number, is a speed threshold for determining whether or not the operating lever 131 is stopped, and is a value slightly larger than 0 for example (ωi>0). As described above, when the absolute value |ω| of the operation speed ω is less than the speed threshold ωi, the condition determining section 128 determines that there is no intention of operating the operating lever 131. When the absolute value |ω| of the operation speed ω is the speed threshold ωi or more, the condition determining section 128 determines that there is an intention of operating the operating lever 131.

As shown in FIG. 4, when the first solenoid valve validation condition has been satisfied, the current control section 129 outputs a validation signal to the first switch 126*a*, and outputs an invalidation signal to the second switch 126*b*. When the validation signal is inputted, the first switch 126*a* permits supply of a signal to the first current supply section 123*a*, the signal corresponding to the target control current It that is set by the first target current deciding section 122*a*. When the invalidation signal is inputted, the second switch 126*b* forbids supply of a signal to the second current supply section 123*b*, the signal corresponding to the target control current It that is set by the second target current deciding section 122*b*. That is to say, the current control section 129 permits namely validates supply of the control current from the first current supply section 123*a* to the first solenoid valve 142*p* that has been presumed or confirmed to be used. The current control section 129 forbids namely invalidates supply of the control current from the second current supply section 123*b* to the second solenoid valve 142*m* that has not been presumed nor confirmed to be used.

In a similar manner, as shown in FIG. 4, when the second solenoid valve validation condition has been satisfied, the current control section 129 outputs an invalidation signal to the first switch 126*a*, and outputs a validation signal to the second switch 126*b*. When the validation signal is inputted, the second switch 126*b* permits supply of a signal to the second current supply section 123*b*, the signal corresponding to the target control current It that is set by the second target current deciding section 122*b*. When the invalidation signal is inputted, the first switch 126*a* forbids supply of a signal to the first current supply section 123*a*, the signal corresponding to the target control current It that is set by the first target current deciding section 122*a*. That is to say, the current control section 129 permits namely validates supply of the control current from the second current supply section 123*b* to the second solenoid valve 142*m* that has been presumed or confirmed to be used. The current control section 129 forbids namely invalidates supply of the control current from the first current supply section 123*a* to the first solenoid valve 142*p* that has not been presumed nor confirmed to be used.

When neither the first solenoid valve validation condition nor the second solenoid valve validation condition has been satisfied, the current control section 129 outputs an invalidation signal to each of the first switch 126*a* and the second switch 126*b*. Thereby, supply of a signal corresponding to the target control current It to each of the first current supply section 123*a* and the second current supply section 123*b* by the first switch 126*a* and the second switch 126*b* is forbidden. That is to say, the current control section 129 forbids namely invalidates supply of the control current from each of the first current supply section 123*a* and the second current supply section 123*b* to each of the first solenoid valve 142*p* and the second solenoid valve 142*m* which have not been presumed nor confirmed to be used.

As shown in FIG. 6, when the first solenoid valve validation condition has been satisfied, supply of a current from the first current supply section 123*a* to the first solenoid valve 142*p* is permitted (turning on the first solenoid valve), and supply of a current from the second current supply section 123*b* to the second solenoid valve 142*m* is forbidden (turning off the second solenoid valve). When the second solenoid valve validation condition has been satisfied, supply of a current from the first current supply section 123*a* to the first solenoid valve 142*p* is forbidden (turning off the first solenoid valve), and supply of a current from the second current supply section 123*b* to the second solenoid valve 142*m* is permitted (turning on the second solenoid valve).

When neither the first solenoid valve validation condition nor the second solenoid valve validation condition has been satisfied, supply of a current from the first current supply section 123a to the first solenoid valve 142p is forbidden (turning off the first solenoid valve), and supply of a current from the second current supply section 123b to the second solenoid valve 142m is forbidden (turning off the second solenoid valve).

Figure 7:
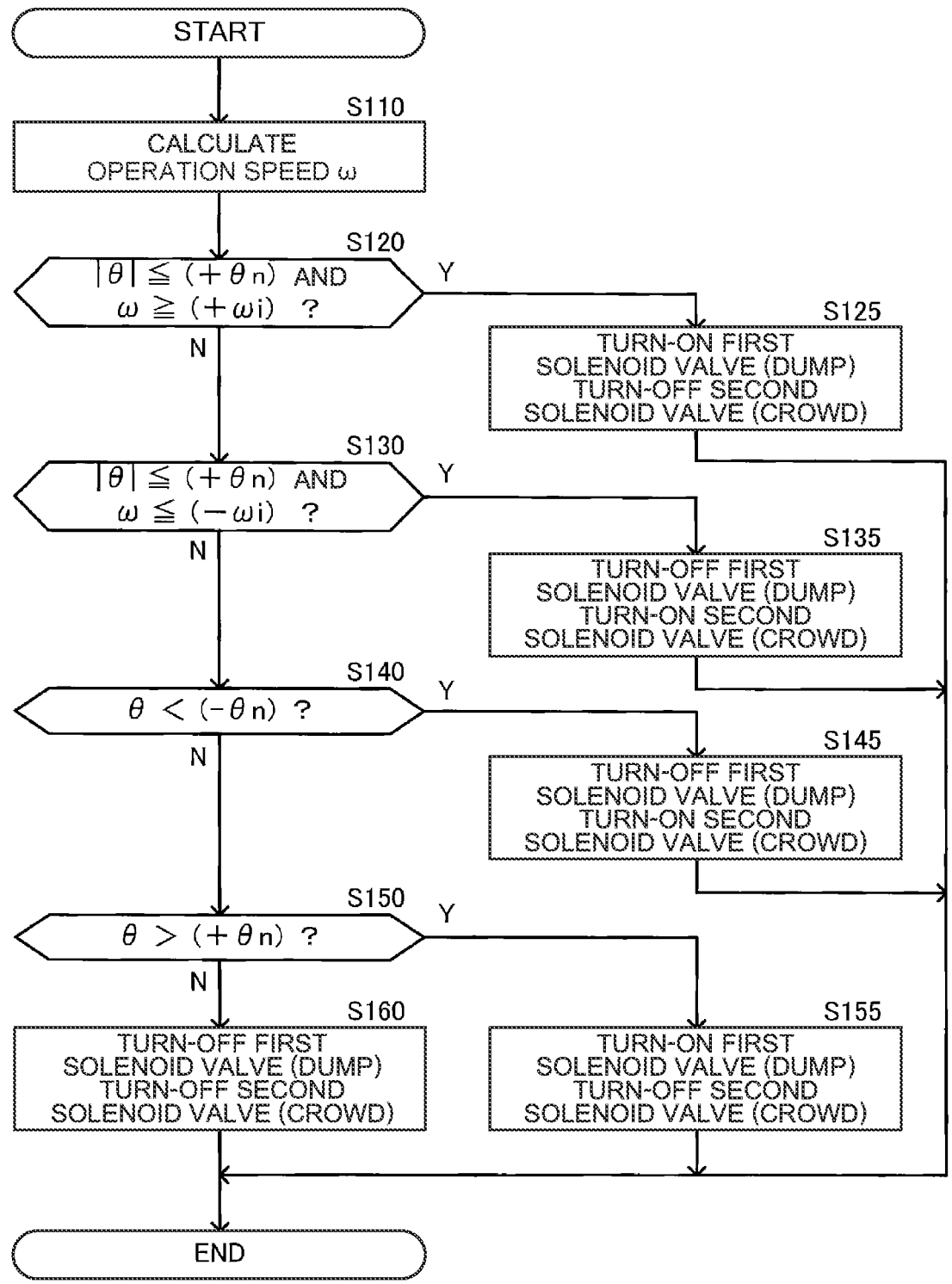
FIG. 7 is a flowchart that shows an example of the process according to a solenoid valve control program executed by the controller according to the first embodiment of the present invention.

FIG. 7 is a flowchart that shows an example of the process according to a solenoid valve control program executed by the controller 120 according to the first embodiment of the present invention. The process shown in the flowchart of FIG. 7 is started by turning on an ignition switch (not illustrated), and after an initial setting that is not illustrated is executed, the processes of Step S110 and onward are repeated by the controller 120 at every predetermined control period (approximately 1 ms to 10 ms for example). Further, although it is not illustrated, the controller 120 acquires information of the manipulated angle θ detected by the manipulated variable sensor 133 at every predetermined control period. In explanation of the flowchart, an event that the controller outputs an ON-signal to a solenoid valve means that the controller permits supply of a current to the solenoid valve, and an event that the controller outputs an OFF-signal to a solenoid valve means that the controller forbids supply of a current to the solenoid valve.

As shown in FIG. 7, in Step S110, the controller 120 calculates the operation speed ω based on the manipulated angle θ detected by the manipulated variable sensor 133, and the process proceeds to Step S120.

In Step S120, the controller 120 determines whether or not the absolute value |θ| of the manipulated angle θ is the first angle threshold (+θn) or less, and whether or not the operation speed ω calculated in Step S110 is the first speed threshold (+ωi) or above. The process proceeds to Step S125 when it is determined to be affirmative in Step S120, and the process proceeds to Step S130 when it is determined to be negative in Step S120.

In Step S125, the controller 120 outputs an ON-signal to the first solenoid valve 142p, outputs an OFF-signal to the second solenoid valve 142m, and finishes the processes shown in the flowchart of FIG. 7.

In Step S130, the controller 120 determines whether or not the absolute value |θ| of the manipulated angle θ is the first angle threshold (+θ) or less and the operation speed ω calculated in Step S110 is the second speed threshold (−ωi) or below. The process proceeds to Step S135 when it is determined to be affirmative in Step S130, and the process proceeds to Step S140 when it is determined to be negative in Step S130.

In Step S135, the controller 120 outputs an OFF-signal to the first solenoid valve 142p, outputs an ON-signal to the second solenoid valve 142m, and finishes the processes shown in the flowchart of FIG. 7.

In Step S140, the controller 120 determines whether or not the manipulated angle θ is less than the second angle threshold (−θn). The process proceeds to Step S145 when it is determined to be affirmative in Step S140, and the process proceeds to Step S150 when it is determined to be negative in Step S140.

In Step S145, the controller 120 outputs an OFF-signal to the first solenoid valve 142p, outputs an ON-signal to the second solenoid valve 142m, and finishes the processes shown in the flowchart of FIG. 7.

In Step S150, the controller 120 determines whether or not the manipulated angle θ is larger than the first angle threshold (+θn). The process proceeds to Step S155 when it is determined to be affirmative in Step S150, and the process proceeds to Step S160 when it is determined to be negative in Step S150.

In Step S155, the controller 120 outputs an ON-signal to the first solenoid valve 142p, outputs an OFF-signal to the second solenoid valve 142m, and finishes the processes shown in the flowchart of FIG. 7.

In Step S160, the controller 120 outputs an OFF-signal to the first solenoid valve 142p, outputs an OFF-signal to the second solenoid valve 142m, and finishes the processes shown in the flowchart of FIG. 7.

Referring to FIG. 8, motions of the present embodiment will be explained. Hereinafter, explanation will be made with an example of a waste shaking work executed in a hydraulic excavator. The waste shaking work means working of quickly shaking the bucket 106 in order to shaking and sorting out earth and sand, concrete pieces, iron material, and the like within the bucket 106 other than the normal working such as the excavating work for earth and sand. In the waste shaking work, the dump motion and the crowd motion are repeated alternately.

Figure 8A:
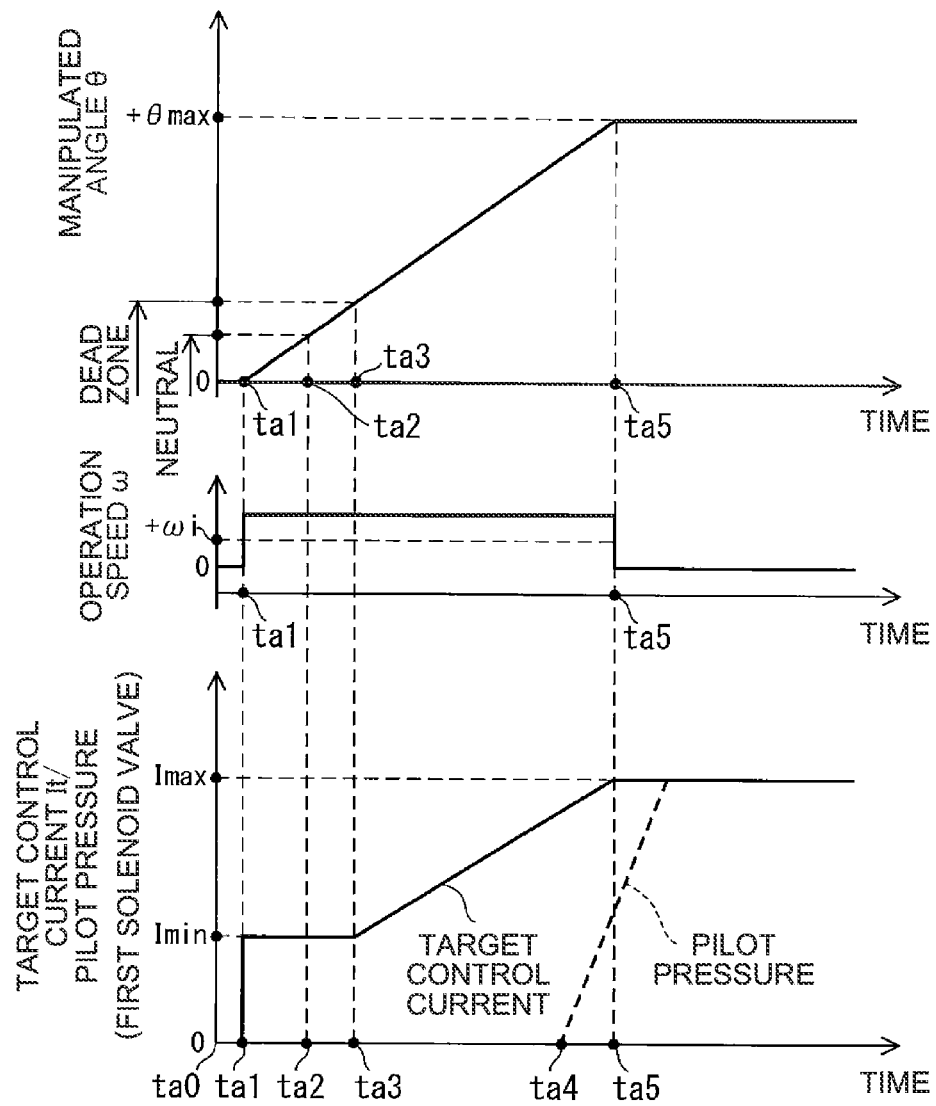
FIG. 8A is a time chart that shows a motion of the controller according to the present embodiment
Figure 8B:
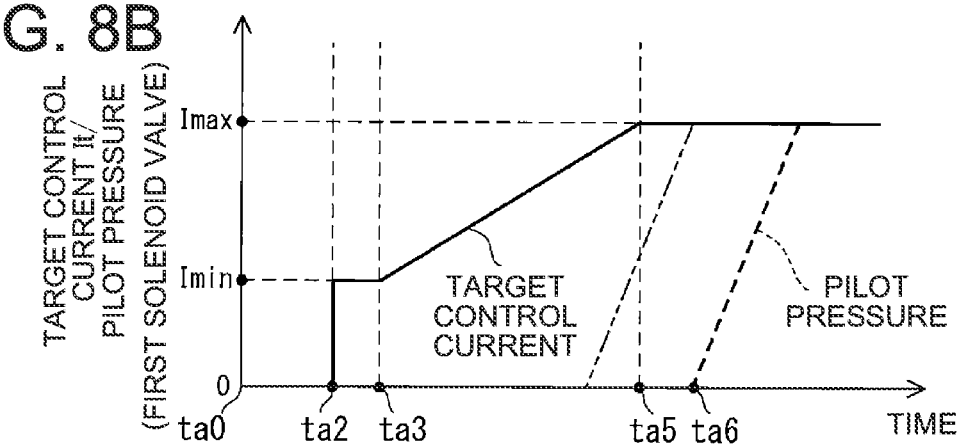
FIG. 8B is a time chart that shows a motion of a controller according to a comparative example.

FIG. 8A is a time chart that shows a motion of the controller 120 according to the present embodiment, and FIG. 8B is a time chart that shows a motion of a controller according to a comparative example. The vertical axis of FIG. 8 shows the elapsed time. The upper graph of FIG. 8A shows the temporal change of the manipulated angle θ, the middle graph shows the temporal change of the operation speed ω, and the lower graph shows the temporal change of the target control current It with respect to the first solenoid valve 142p. Also, in the lower graph of FIG. 8A, the temporal change of the pilot pressure generated by the first solenoid valve 142p is also illustrated by a broken line. FIG. 8B is a drawing similar to the lower graph of FIG. 8A, and shows the temporal change of the target control current It and the temporal change of the pilot pressure. Also, regardless of the operation speed ω, a controller according to a comparative example forbids supply of a control current to a solenoid valve when the operating lever 131 is disposed within the neutral range, and permits supply of a control current to a solenoid valve when the operating lever 131 is disposed outside the neutral range.

At the time point ta0, the hand of the operator does not touch the operating lever 131, and the operating lever 131 is in a non-operated state. From this state, when the operator operates the operating lever 131 to the bucket dumping direction (the positive direction), the operation speed ω increases (time point ta1). When the operation speed ω increases, since the first solenoid valve validation condition described above is satisfied (Yes in Step S120), the standby current Imin is supplied to the first solenoid valve 142p.

When the operating position of the operating lever 131 is operated so as to go beyond the dead zone, the target control current It increases accompanying increase of the manipulated angle θ (time point ta3 to time point ta5). Because the control current supplied to the first solenoid valve 142p increases, the pilot pressure rises from the time point ta4. When the operating lever 131 is operated to the maximum manipulated angle (+θmax) at the time point ta5, the operation speed ω becomes 0.

Meanwhile, in the comparative example, while the operating lever 131 is positioned within the neutral range, the standby current Imin is not supplied to the first solenoid valve 142p (time point ta0 to time point ta2). In the comparative example, when the operating lever 131 is positioned outside the neutral range and within the dead zone, the standby current Imin is supplied to the first solenoid valve 142*p* (time point ta2 to time point ta3). In the comparative example, since the timing of starting supply of the standby current Imin (time point ta2) is delayed compared to the present embodiment, the application time of the standby current is short. When the application time of the standby current is short, the impact of the static friction force with respect to the sliding part of the spool of the first solenoid valve 142*p* remains, and the starting motion of the spool becomes slow. As a result, in the comparative example, the timing of starting increase of the pilot pressure (time point ta6) is delayed compared to the present embodiment.

In the present embodiment, even in a state that the operating lever 131 is positioned within the neutral range, when it is determined that the operator has an intention of operating the operating lever 131 to the bucket dumping direction (the positive direction), the first solenoid valve 142*p* is presumed to be used, and the standby current Imin is supplied to the first solenoid valve 142*p*. Therefore, in the present embodiment, the supply timing of the standby current Imin is earlier compared to the comparative example (time point ta1<time point ta2). That is to say, the application time of the standby current can be secured sufficiently, and friction in the inside of the solenoid valve can be shifted from static friction to dynamic friction. As a result, in the present embodiment, the timing of starting increase of the pilot pressure is earlier compared to the comparative example (time point ta4<time point ta6).

FIG. 9A is a time chart that shows a motion of the controller 120 according to the present embodiment, and FIG. 9B is a time chart that shows a motion of a controller according to a comparative example. FIG. 9 is a drawing similar to FIG. 8, and the horizontal axis of FIG. 9 shows the elapsed time. The upper graph of FIG. 9A shows the temporal change of the manipulated angle θ, the middle graph shows the temporal change of the operation speed ω, and the lower graph shows the temporal change of the target control current It with respect to the second solenoid valve 142*m*. Also, in the lower graph of FIG. 9A, the temporal change of the pilot pressure generated by the second solenoid valve 142*m* is also illustrated by a broken line. FIG. 9B is a drawing similar to the lower graph of FIG. 9A, and shows the temporal change of the target control current It and the temporal change of the pilot pressure.

In the waste shaking work, the crowd motion is executed after the dump motion described above (refer to FIG. 8). For example, the operator operates the operating lever 131 to the maximum manipulated angle (+θmax) of the bucket dumping direction, and thereafter operates the operating lever 131 so as to return toward the neutral position. Here, in order to operate the operating lever 131 so as to go beyond the neutral position to the bucket excavating direction, the operator operates the operating lever 131 at a constant operation speed ω without reducing the operation speed ω.

As shown in FIG. 9A, at the time point tb0, the operating lever 131 is located outside the neutral range and is positioned toward the bucket dumping direction with respect to the neutral position (NP), and therefore the control current is not supplied to the second solenoid valve 142*m* (Yes in Step S150). When the operating lever 131 enters the inside of the neutral range in a state where the absolute value |ω| of the operation speed ω is large, since the second solenoid valve validation condition described above is satisfied (Yes in Step S130), the standby current Imin is supplied to the second solenoid valve 142*m* (time point tb1).

When the operating position of the operating lever 131 is operated to the bucket excavating direction (the negative direction) so as to go beyond the dead zone, the target control current It increases accompanying increase of the manipulated angle θ (time point tb3 to time point tb5). Because the control current supplied to the second solenoid valve 142*m* increases, the pilot pressure rises from the time point tb4. When the operating lever 131 is operated to the maximum manipulated angle (−θmax) at the time point tb5, the operation speed ω becomes 0.

Meanwhile, in the comparative example, while the operating lever 131 is positioned within the neutral range, the standby current Imin is not supplied to the second solenoid valve 142*m* (time point tb0 to time point tb2). In the comparative example, when the operating lever 131 is positioned outside the neutral range and within the dead zone, the standby current Imin is supplied to the second solenoid valve 142*m* (time point tb2 to time point tb3). In the comparative example, since the timing of starting supply of the standby current Imin (time point tb2) is delayed compared to the present embodiment, the application time of the standby current is short. When the application time of the standby current is short, the impact of the static friction force with respect to the sliding part of the spool of the first solenoid valve 142*p* remains, and the starting motion of the spool becomes slow. As a result, in the comparative example, the timing of starting increase of the pilot pressure (time point tb6) is delayed compared to the present embodiment.

In the present embodiment, when the absolute value |ω| of the operation speed ω is larger than the preset speed threshold ωi, the operating lever 131 being shifted at the operation speed ω from a state of being operated to one of the positive side and the negative side within the neutral range toward the other of the positive side and the negative side, the condition determining section 128 determines that there is an intention of operation to the other of the positive side and the negative side. When it has been determined that there is an intention of operation to the other of the positive side and the negative side, the current control section 129 causes the standby current Imin to be supplied from the current supply section 123 to the solenoid of the solenoid valve of the other of the positive side and the negative side.

Therefore, even in a state that the operating lever 131 is positioned within the neutral range on the positive side of the neutral position NP as shown in FIG. 9, when it is determined that the operator has an intention of operating the operating lever 131 to the bucket excavating direction (the negative direction), the second solenoid valve 142*m* is presumed to be used, and the standby current Imin is supplied to the second solenoid valve 142*m*. Thereby, in the present embodiment, the supply timing of the standby current Imin is earlier compared to the comparative example (time point tb1<time point tb2). That is to say, the application time of the standby current can be secured sufficiently, and friction in the inside of the solenoid valve can be changed from static friction to dynamic friction. As a result, in the present embodiment, the timing of starting increase of the pilot pressure is earlier compared to the comparative example (time point tb4<time point tb6).

When the waste shaking work by the hydraulic excavator 100 is to be finished, if the operator returns the operating lever 131 to the neutral position (NP) and releases the hand from the grip part 131*a* of the operating lever 131, the operation speed ω becomes 0, and supply of a current to a solenoid valve stops (Step S160).

Although a case of operating the operating lever 131 from the non-operated state to the bucket dumping direction was explained in FIG. 8, a case of operating the operating lever 131 from the non-operated state to the bucket excavating direction is also similar. Further, a case of executing a switching operation from the operation toward the bucket dumping direction to the bucket excavating direction was explained in FIG. 9, a case of executing a switching operation from the operation toward the bucket excavating direction to the bucket dumping direction is also similar.

Although the solenoid valve device 140 that drove the bucket cylinder 106a was representatively explained, other hydraulic actuators namely the arm cylinder 105a, the boom cylinder 104a, and the swing motor for example are also similar. That is to say, with respect to other hydraulic actuators also, by employing such configuration that the standby current is supplied when an intention of operation of the operator is detected by the controller 120 in a state where the operating lever 131 is positioned within the neutral range, the responsiveness of the solenoid valve device and the hydraulic actuator with respect to an operation can be improved.

According to the embodiments described above, following actions and effects can be secured.

(1) The hydraulic excavator 100 includes the main pump 151, the hydraulic actuator HA that is driven by a pressure oil discharged from the main pump 151, the solenoid valve device 140 that controls a flow of the pressure oil supplied from the main pump 151 to the hydraulic actuator HA, and the operation device 130 that operates the solenoid valve device 140.

The controller 120 includes the current supply section 123 that supplies a current to the solenoid of the solenoid valve device 140 based on the operation of the operating lever 131.

The controller 120 includes the operation intention determining section (the condition determining section 128) that determines whether or not there is an intention of operating the operating lever 131 of the operation device 130 by the operator based on the change of the state of the operating lever 131 (the operation speed ω that is the temporal change rate of the manipulated angle θ in the present embodiment).

The controller 120 includes the current control section 129 that controls supply of a current from the current supply section 123 to the solenoid valve device 140 based on the position of the operating lever 131 and the determination result of the operation intention determining section (the condition determining section 128). By supplying the current to the solenoid valve device 140 at a stage of detecting the operator's intention of operation, the responsiveness of the solenoid valve device 140 with respect to an operation can be improved.

(2) The controller 120 includes the operation position determining section (the condition determining section 128) that determines whether or not the operating lever 131 is disposed within the preset neutral range. When it has been determined that the operating lever 131 is disposed within the neutral range and that there is an intention of operating the operating lever 131, the current control section 129 permits supply of the standby current Imin from the current supply section 123 to the solenoid valve device 140, the standby current Imin being lower than a current of the time the hydraulic actuator HA starts driving. Thus, if an operation intention of the operator has been detected when the operating lever 131 is positioned within the neutral range, the standby current is supplied, and thereby the responsiveness of the solenoid valve device 140 and the hydraulic actuator HA with respect to an operation can be improved.

(3) When it has been determined that the operating lever 131 is disposed within the neutral range and that there is no intention of operating the operating lever 131, the controller 120 forbids supply of the standby current Imin from the current supply section 123 to the solenoid valve device 140. That is to say, if the operator's intention of operation has not been detected when the operating lever 131 is positioned within the neutral range, the standby current is not supplied to the solenoid of the solenoid valve device 140. Thereby, even when the calculation result of the target control current It has become an abnormal value because of mixing of the noise between the controller 120 and the control device 130, and so on, the hydraulic actuator HA can be stopped by that the operator returns the operating lever 131 to the neutral position. That is to say, such event can be prevented that the hydraulic actuator HA executes a motion different from the operator's intention.

(4) The operation speed calculating section 127 calculates the operation speed ω of the operating lever 131 based on the manipulated angle θ of the operating lever 131. When the absolute value |ω| of the operation speed ω of the operating lever 131 is larger than the preset speed threshold (ωi), the condition determining section 128 determines that there is an intention of operating the operating lever 131. When the absolute value |ω| of the operation speed ω of the operating lever 131 is smaller than the preset speed threshold (ωi), the condition determining section 128 determines that there is no intention of operating the operating lever 131.

In such case that the operating lever 131 is maintained at the neutral position (NP) in a state where the operator grips the operating lever 131, a current is not supplied to the solenoid of the solenoid valve device 140. Therefore, even when there is mixing of the noise between the controller 120 and the operation device 130, and so on and the calculation result of the target control current It becomes an abnormal value, the operator only has to return the operating lever 131 to the neutral position, and does not have to release the hand from the grip part 131a. By that the operator returns the operating lever 131 to the neutral position, the hydraulic actuator HA can be stopped quickly. Further, the supply time of the standby current can be shortened also.

(5) The operating lever 131 is configured so as to be capable of rotating to the positive side and the negative side from the neutral position (NP) in the neutral range. The solenoid valve device 140 includes the direction control valve 141, the first solenoid valve 142p, and the second solenoid valve 142m. The direction control valve 141 controls a flow of the pressure oil supplied from the main pump 151 to the hydraulic actuator HA. The first solenoid valve 142p is a solenoid proportional pressure reducing valve of the positive side which generates the pilot pressure supplied to the first pilot section 141p of the direction control valve 141 when the operating lever 131 is operated so as to rotate to the positive side of the outside of the neutral range. The second solenoid valve 142m is a solenoid proportional pressure reducing valve of the negative side which generates the pilot pressure supplied to the second pilot section 141m of the direction control valve 141 when the operating lever 131 is operated so as to rotate to the negative side of the outside of the neutral range.

The current supply section 123 supplies a current to the solenoid 143p of the first solenoid valve 142p when the operating lever 131 is operated so as to rotate to the positive side, and supplies a current to the solenoid 143m of the second solenoid valve 142m when the operating lever 131 is operated so as to rotate to the negative side. When the absolute value |ω| of the operation speed ω while the operating lever 131 is within the neutral range is larger than the preset speed threshold ωi, the operation intention determining section (the condition determining section 128)

determines that there is an intention of operation to the positive side when the operation speed ω is positive, and to the negative side when the operation speed ω is negative. For example, when the absolute value |ω| of the operation speed ω is larger than the speed threshold ωi, the operating lever 131 being shifted at the operation speed ω from a state of being operated to one of the positive side and the negative side of the neutral range toward the other of the positive side and the negative side, the operation intention determining section (the condition determining section 128) determines that there is an intention of operating the operating lever 131 to the other of the positive side and the negative side. Also, in the present embodiment, the operated direction (the bucket dumping direction or the bucket excavating direction) is determined according to whether the operation speed ω is positive or negative. When it is determined that there is an intention of operation to the positive side or the negative side, the current control section 129 causes the standby current to be supplied from the current supply section 123 to the solenoid of the solenoid valve of a side out of the positive side and the negative side, an event that there is at least an intention of operating the operating lever 131 to the side having being determined.

Thus, in the present embodiment, with respect to the operating lever 131 operated alternately to the first direction (the positive direction) and the second direction (the negative direction) that is the opposite direction of the first direction, operation of the opposite direction going beyond the neutral position (NP) is predicted, and the standby current is supplied to a solenoid valve whose use is presumed. For example, when an intention of operating the operating lever 131 to the negative direction has been detected from the time of a state that the operating lever 131 is positioned to the positive direction of the neutral position (NP), it is possible to presume that the second solenoid valve 142m would be used and to supply the standby current to the second solenoid valve 142m beforehand. Thereby, in such case of the waste shaking work that the operating lever 131 is quickly operated alternately to the first direction and the second direction (to the left and right in the present embodiment), the responsiveness of the hydraulic actuator HA can be improved. Improvement of the responsiveness contributes to improvement of the working efficiency and improvement of the operability.

Second Embodiment

Figure 10:
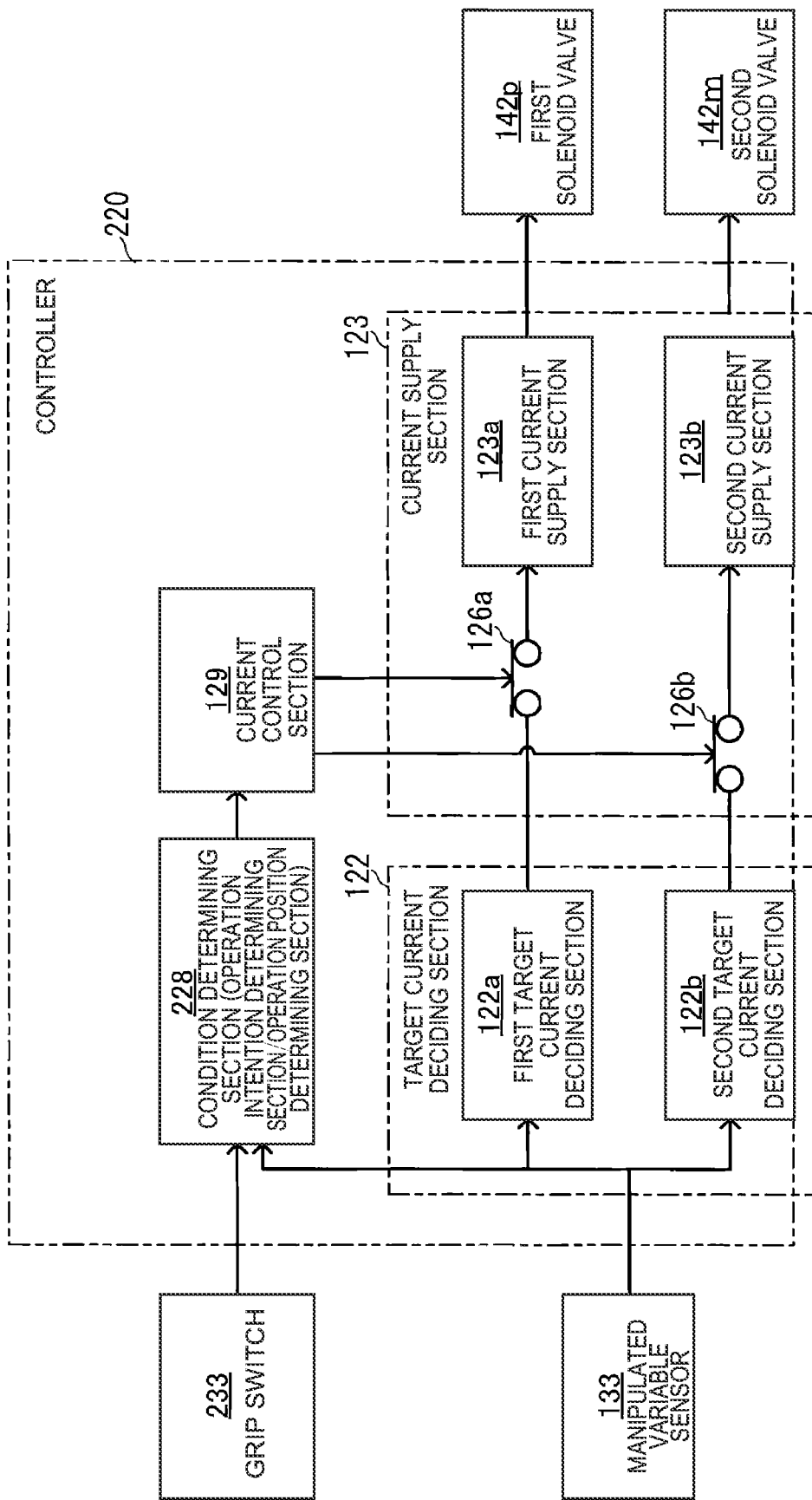
FIG. 10 is a block diagram that shows a configuration of a controller according to the second embodiment of the present invention.
Figure 11:
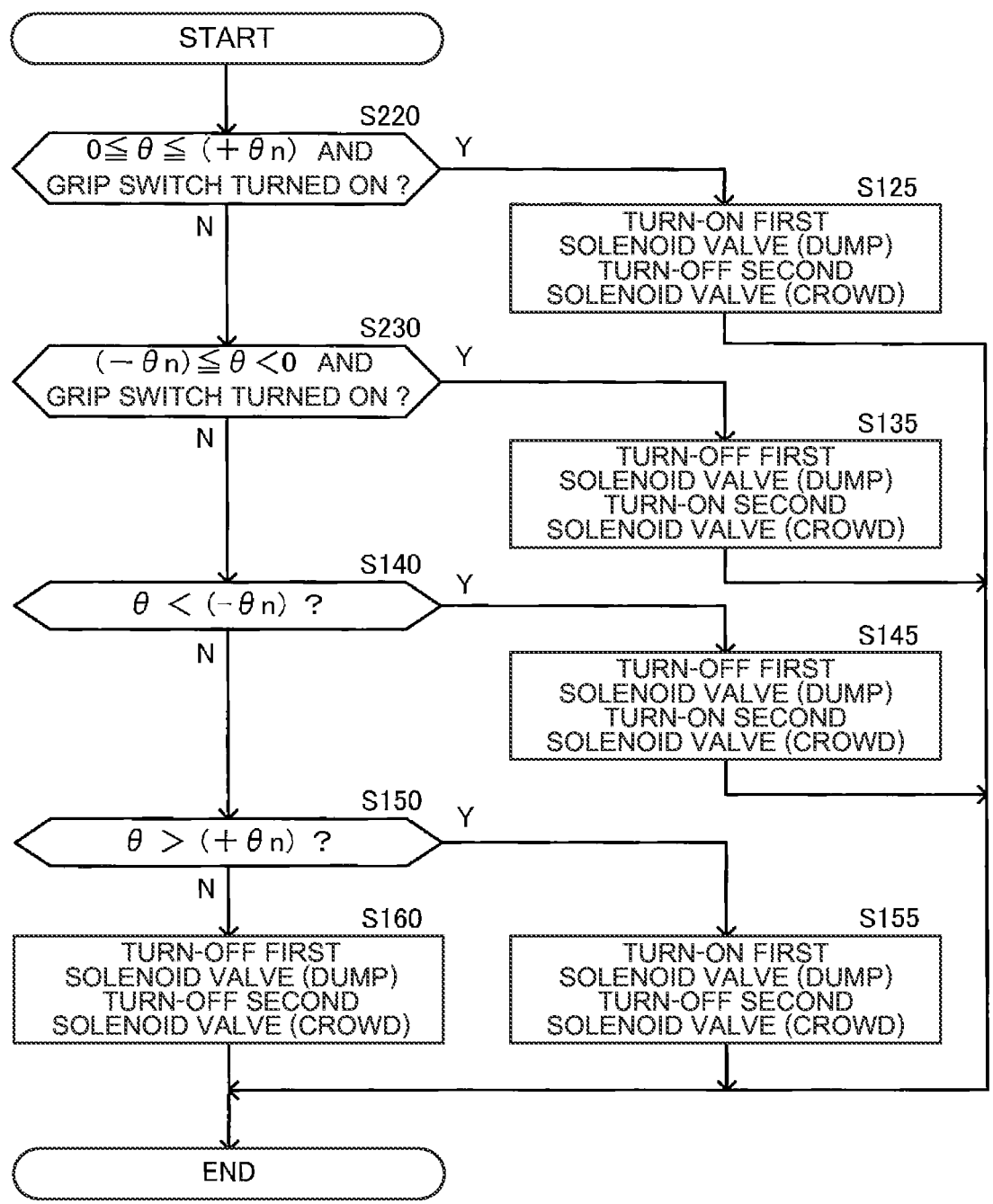
FIG. 11 is a flowchart that shows an example of the process according to a solenoid valve control program executed by the controller according to the second embodiment of the present invention.

Referring to FIG. 10 and FIG. 11, a work machine according to the second embodiment of the present invention will be explained. Also, in the drawings, a portion the same as or equivalent to that of the first embodiment will be marked with a same reference sign, and the different points will be mainly explained. In the first embodiment described above, such example was explained that the operator's intention of operating the operating lever 131 was determined based on the operation speed ω. Meanwhile, in the second embodiment, the operator's intention of operating the operating lever 131 is determined by whether or not the operating lever 131 is gripped.

FIG. 10 is a drawing similar to FIG. 4, and is a block diagram that shows a configuration of a controller 220 according to the second embodiment of the present invention. As shown in FIG. 10, a signal from a grip switch 223 arranged in the grip part 131a of the operating lever 131 is inputted to the controller 220.

The grip switch 223 outputs an ON-signal that expresses an event of having been gripped when the operating lever 131 has been gripped by the operator, and outputs an OFF-signal that expresses an event of having not been gripped when the operating lever 131 has not been gripped by the operator. When the OFF-signal is outputted from the grip switch 233, a condition determining section 228 determines that there is no intention of operating the operating lever 131.

When the ON-signal has been outputted from the grip switch 233 in a state where the operating lever 131 is positioned on the positive side of the inside of the neutral range, the condition determining section 228 determines that there is an intention of operating the operating lever 131 to the positive direction. When the ON-signal had been outputted from the grip switch 233 in a state where the operating lever 131 was positioned on the negative side of the inside of the neutral range, the condition determining section 228 determines that there is an intention of operating the operating lever 131 to the negative direction.

FIG. 11 is a drawing similar to FIG. 7, and is a flowchart that shows an example of the process according to a solenoid valve control program executed by the controller 220 according to the second embodiment of the present invention. In the flowchart shown in FIG. 11, the process of Step S110 of the flowchart of FIG. 7 is omitted, and the processes of Steps S220, S230 are executed instead of Steps S120, S130. Also, a process the same as a process shown in FIG. 7 is marked with a same reference sign, and processes different from processes shown in FIG. 7 will be mainly explained. The processes shown in this flowchart are started by turning on an ignition switch not illustrated, and the processes of Step S220 and onward are repeated by the controller 220 at every predetermined control period after executing an initial setting that is not illustrated. Further, although it is not illustrated, the controller 220 acquires information of a signal (ON/OFF-signal) outputted from the grip switch 233 and information of the manipulated angle θ detected by the manipulated variable sensor 133 at every predetermined control period.

In Step S220, the controller 220 determines whether or not the manipulated angle θ is 0° or more and the first angle threshold (+θn) or less and an ON-signal has been outputted from the grip switch 233. The process proceeds to Step S125 when it is determined to be affirmative in Step S220, and the process proceeds to Step S230 when it is determined to be negative in Step S220.

In Step S230, the controller 220 determines whether or not the manipulated angle θ is less than 0° and the second angle threshold (−θn) or more and an ON-signal has been outputted from the grip switch 233. The process proceeds to Step S135 when it is determined to be affirmative in Step S230, and the process proceeds to Step S140 when it is determined to be negative in Step S230.

Thus, in the second embodiment, when an ON-signal has been outputted from the grip switch 233, the operation intention determining section (the condition determining section 228) determines that there is an intention of operating the operating lever 131. When an OFF-signal has been outputted from the grip switch 233, the operation intention determining section (the condition determining section 228) determines that there is no intention of operating the operating lever 131. According to such second embodiment, the actions and the effects similar to (1) to (3) explained in the first embodiment are exhibited.

Such modifications as described below are also within the scope of the present invention, and it is also possible to combine one or plural modifications with the embodiments described above.

(Modification 1)

Although explanation was made with an example of the solenoid valve device 140 (refer to FIG. 2) that included the direction control valve 141 of the hydraulic pilot type and the solenoid valves 142p, 142m that generated the pilot pressure outputted to the direction control valve 141 in the embodiments described above, the present invention is not limited to this.

(Modification 1-1)

Figure 12:
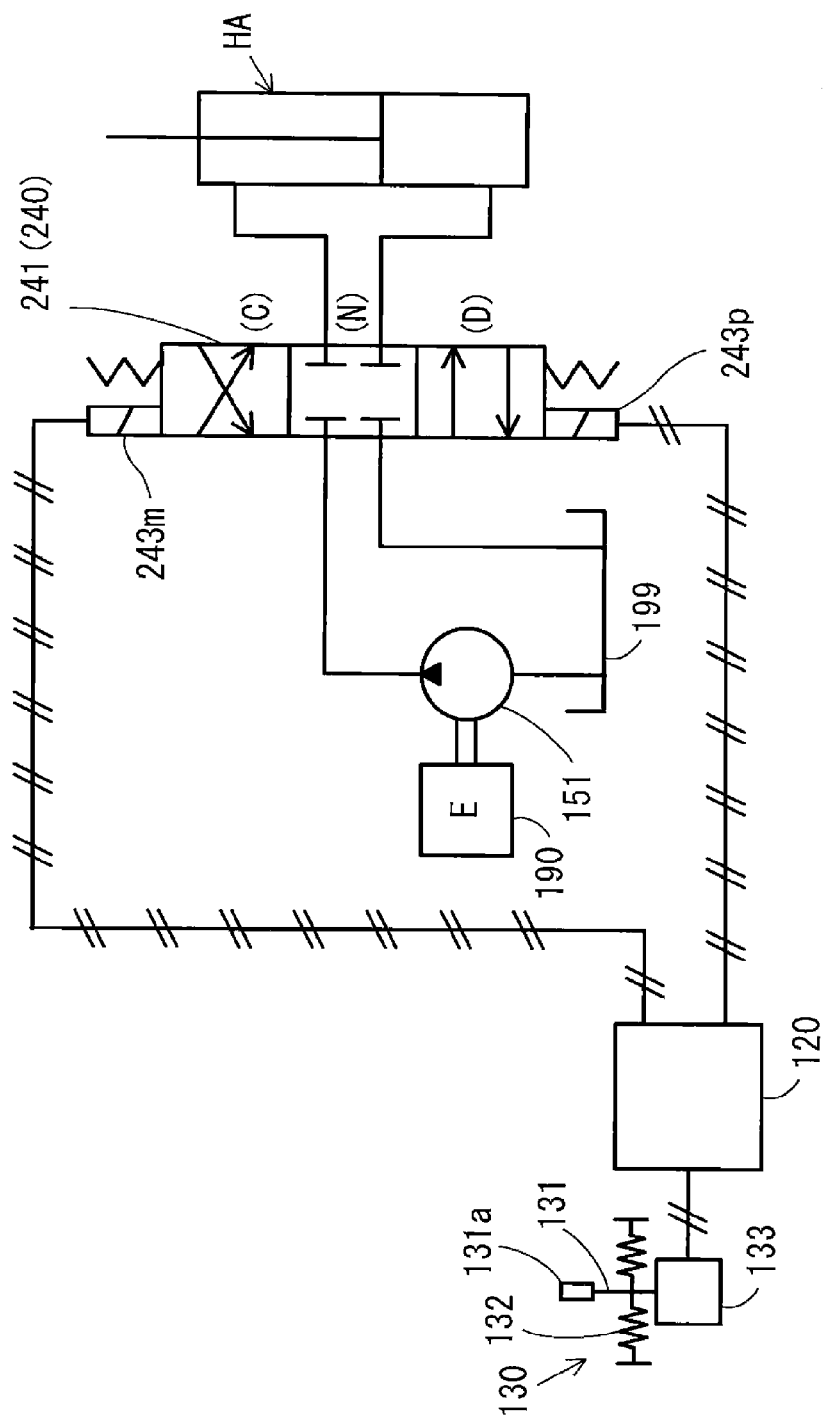
FIG. 12 is a drawing that shows a schematic configuration of a hydraulic excavator according to a modification of the present invention.

As shown in FIG. 12, as a solenoid valve device 240 that drives the hydraulic actuator HA of a small size, a direction control valve 241 of an electromagnetic driving type including solenoids 243p, 243m may be employed. In this case, the first solenoid valve 142p and the second solenoid valve 142m (refer to FIG. 2) are omitted. When a control current is supplied from the first current supply section 123a to the first solenoid 243p of the direction control valve 241 and the first solenoid 243p is magnetized, the spool of the direction control valve 241 moves to the position (D) side. When a control current is supplied from the second current supply section 123b to the second solenoid 243m of the direction control valve 241 and the second solenoid 243m is magnetized, the spool of the direction control valve 241 moves to the position (C) side. According to such modification, the actions and the effects similar to those of the embodiments described above are exhibited.

(Modification 1-2)

Although it is not illustrated, instead of the first solenoid valve 142p and the second solenoid valve 142m, a single solenoid proportional pressure reducing valve and a single solenoid selector valve may be arranged. In this case, when the operating lever 131 is operated to one side, the decompression degree of the solenoid proportional pressure reducing valve is set according to the manipulated variable, the solenoid selector valve is switched to one side according to the manipulated direction, and a pilot pressure is supplied to the first pilot section 141p of the direction control valve 141. When the operating lever 131 is operated to the other side, the decompression degree of the solenoid proportional pressure reducing valve is set according to the manipulated variable, the solenoid selector valve is switched to the other side according to the manipulated direction, and a pilot pressure is supplied to the second pilot section 141m of the direction control valve 141. In such modification, the standby current is supplied to both of the solenoid proportional pressure reducing valve and the solenoid selector valve. According to such modification, the actions and the effects similar to those of the embodiments described above are exhibited.

(Modification 2)

Although such example was explained in the embodiments described above that the manipulated variable sensor 133 was configured of a potentiometer and the voltage according to the rotation angle of the operating lever 131 was outputted, the present invention is not limited to this. As the manipulated variable sensor 133, an angle sensor using a Hall element may be employed. It is also possible to acquire information corresponding to the manipulated angle θ from a network within the hydraulic excavator 100 called CAN (Controller Area Network). In this case, the number of wiring can be suppressed, and the noise can be reduced. The manipulated angle θ may be obtained using a PWM duty corresponding to the angle of the operating lever 131. In this case, the noise can be reduced. Also, as the potentiometer and the like explained in the embodiments described above, to employ a sensor that outputs the voltage and current is appropriate from the viewpoint of improvement of the responsiveness.

(Modification 3)

The angle threshold and the operation speed threshold described above may have hysteresis. Also, the first solenoid valve validation condition and the second solenoid valve validation condition may be determined to have been satisfied by an event that a state of satisfying the conditions described above (Steps S120, 130, 140, 150) continues for a predetermined time (approximately two to three times of the control period for example). Thereby, a solenoid valve that is used appropriately even when a transitional noise has been superposed on the manipulated angle θ and the operation speed ω can be presumed or confirmed.

(Modification 4)

Although explanation was made with an example of the restoring mechanism including the return spring 132 in the embodiments described above, the present invention is not limited to this. It is also possible to employ a restoring mechanism including a cylinder in which a compressive gas such as the air and a nitrogen gas is sealed and the damping property and the spring property are provided instead of the return spring 132.

(Modification 5)

Although explanation was made with respect to such example that the operating lever 131 was configured to be rotatable to the positive direction and the negative direction from the neutral position (NP) in the embodiments described above, the present invention is not limited to this. For example, it may be configured to be rotatable only to the positive direction from the neutral position (NP). In this case, the responsiveness can be improved with respect to one motion of one hydraulic actuator (for example a motion of a hydraulic breaker in which the supply port and the discharge port of the hydraulic oil have been decided).

(Modification 6)

Although explanation was made with respect to an example that supply and shut-off of a current to the solenoid valves 142p, 142m were executed by controlling the first switch 126a and the second switch 126b between the target current deciding section 122 and the current supply section 123 by the current control section 129 in the embodiments described above, the present invention is not limited to this. For example, the first switch 126a and the second switch 126b may be arranged between the current supply section 123 and the solenoid valves 142p, 142m.

(Modification 7)

With respect to the controller 120 described above, a part or all of the functions may be furnished as software that is operated on hardware, or may be achieved only by hardware configured of an integrated circuit and the like. A program executed by the controller 120 and information of a table, file, and the like may be stored in a storage device such as a hard disk, SSD (Solid State Drive) or a storage medium such as an IC card, SD card, DVD, and the like instead of a memory such as a ROM and RAM described above.

(Modification 8)

Although explanation was made with respect to an example of deciding the target control current It based on the characteristics N1, N2 stored by the table form that had been stored in the storage device of the controller 120 beforehand in the embodiments described above, the present invention is not limited to this. The target control current It may be decided based on the characteristics N1, N2 stored by a function form.

(Modification 9)

In the embodiments described above, the target current deciding section 122 decides a target value for supplying the standby current when the operating lever 131 is disposed within the neutral range, and decides a target value for increasing a current that is supplied from the current supply section 123 to the solenoids 143p, 143m as the manipulated variable of the operating lever 131 increases when the operating lever 131 is not disposed within the neutral range. The current supply section 123 supplies a current to the solenoid of the solenoid valve device 140 based on the target value described above.

When it has been determined that the operating lever 131 is disposed within the neutral range and there is no intention of operating the operating lever 131, the current control section 129 forbids supply of a current from the current supply section 123 to the solenoids 143p, 143m of the solenoid valve device 140. When it has been determined that the operating lever 131 is disposed within the neutral range and there is an intention of operating the operating lever 131, the current control section 129 permits supply of a current from the current supply section 123 to the solenoids 143p, 143m of the solenoid valve device 140.

Thus, by a configuration of permitting or forbidding supply of the current to the solenoids 143p, 143m based on the target control current It decided by the target current deciding section 122, the calculation process of the controller 120 can be simplified; however, the present invention is not limited to this. For example, it may be configured to determine forbidding/permitting supply of the standby current first based on whether or not an intention of operation has been detected, and to calculate thereafter the control current for driving the hydraulic actuator which increases accompanying increase of the manipulated angle θ based on the determination result of whether or not the standby current is supplied.

(Modification 10)

Although explanation was made with respect to an example of employing an operation member that was rotatable to the positive side and the negative side from the neutral position (NP) in the neutral range for the operating lever 131 in the embodiments described above, the present invention is not limited to this. For example, an operation member capable of slide movement to the positive side and the negative side from the neutral position (NP) may be employed. In this case, for the manipulated variable sensor of the operation member, a linear potentiometer and a linear transducer for example which detect the position of the linear movement of the operation member can be employed.

(Modification 11)

With respect to the speed threshold ωi, explanation was made with respect to an example of employing a value slightly larger than 0 as the speed threshold for determining whether or not the operating lever 131 stops; however, the present invention is not limited to this. With respect to the speed threshold ωi, in order to apply the standby current for working where quick operation is executed and high responsiveness is required such as the waste shaking work of the bucket 106, an operation speed for determining whether or not the operating lever 131 has been quickly operated may be set. In this case, a value that is large to a certain degree is employed for the speed threshold ωi.

(Modification 12)

Although the embodiments described above were explained with an example of the hydraulic excavator (back hoe) of the crawler type, the present invention is not limited to this. The present invention can be applied also to a loading excavator, a wheel-type hydraulic excavator, and the like for example. Further, the present invention can be applied also in a similar manner to various work machines such as a crane and a wheel loader.

Although various embodiments and modifications were explained above, the present invention is not limited to the contents of them. Other aspects conceivable within the scope of the technical idea of the present invention are to be also included within the scope of the present invention.

REFERENCE SIGNS LIST

100 . . . Hydraulic excavator (work machine)
122 . . . Target current deciding section
123 . . . Current supply section
127 . . . Operation speed calculating section
128 . . . Condition determining section (operation intention determining section, operation position determining section)
129 . . . Current control section
131 . . . Operating lever (operation member)
133 . . . Manipulated variable sensor (manipulated variable detection device)
140 . . . Solenoid valve device
141 . . . Direction control valve
142p . . . First solenoid valve (solenoid proportional pressure reducing valve of positive side)
142m . . . Second solenoid valve (solenoid proportional pressure reducing valve of negative side)
143p, 143m . . . Solenoid
151 . . . Main pump (hydraulic pump)
228 . . . Condition determining section (operation intention determining section, operation position determining section)
233 . . . Grip switch (switch)
241 . . . Direction control valve
243p, 243m . . . Solenoid
HA . . . Hydraulic actuator

The invention claimed is:

1. A work machine comprising a hydraulic pump, a hydraulic actuator that is driven by a pressure oil discharged from the hydraulic pump, a solenoid valve device that controls a flow of a pressure oil supplied from the hydraulic pump to the hydraulic actuator, an operation member through which the solenoid valve device is operated, and an operation position determining section that determines whether or not the operation member is disposed within a preset neutral range, wherein the work machine further comprises:
an operation intention determining section that determines whether or not an operator intends to operate the operation member based on a state change of the operation member;
a current supplying section that supplies a current to the solenoid valve device based on an operation of the operation member; and
a current control section that allows a standby current, that is lower than a current of the time when the hydraulic actuator starts driving, to be supplied from the current supplying section to the solenoid valve device when the operation position determining section determines that the operation member is disposed within the neutral range and the operation intention determining section determines that there is an intention to operate the operation member.

2. The work machine according to claim 1,
wherein, when it has been determined by the operation position determining section that the operation member is disposed within the neutral range and it has been determined by the operation intention determining section that there is no intention of operating the operation member, the current control section forbids supply of the standby current from the current supply section to the solenoid valve device.

3. The work machine according to claim 2, further comprising:
a manipulated variable detection device that detects the manipulated variable of the operation member; and
a target current deciding section that decides the target value of a current supplied from the current supply section to the solenoid valve device based on the manipulated variable of the operation member,
wherein the target current deciding section decides a target value for supplying the standby current when the operation member is disposed within the neutral range, and decides a target value for increasing a current that is supplied from the current supply section to the solenoid valve device as the absolute value of the manipulated variable of the operation member increases when the operation member is not disposed within the neutral range,
the current supply section supplies a current to the solenoid valve device based on the target value, and
the current control section forbids supply of a current from the current supply section to the solenoid valve device when it has been determined by the operation position determining section that the operation member is disposed within the neutral range and it has been determined by the operating intention determining section that there is no intention of operating the operation member, and permits supply of a current from the current supply section to the solenoid valve device when it has been determined by the operation position determining section that the operation member is disposed within the neutral range and it has been determined by the operating intention determining section that there is an intention of operating the operation member.

4. The work machine according to claim 2, further comprising:
an operation speed calculating section that calculates the operation speed of the operation member based on the manipulated variable of the operation member,
wherein the operation intention determining section determines that there is an intention of operating the operation member when the absolute value of the operation speed of the operation member is larger than a preset value, and determines that there is no intention of operating the operation member when the absolute value of the operation speed of the operation member is smaller than the preset value.

5. The work machine according to claim 4,
wherein the operation member is an operating lever that is capable of rotating or slide-moving to the positive side and the negative side from a neutral position in the neutral range,
the solenoid valve device comprises: a direction control valve that controls a flow of a pressure oil supplied from the hydraulic pump to the hydraulic actuator; a positive side solenoid proportional pressure reducing valve that generates a pilot pressure supplied to a first pilot section of the direction control valve when the operation member is operated so as to rotate to the positive side of the outside of the neutral range; and a negative side solenoid proportional pressure reducing valve that generates a pilot pressure supplied to a second pilot section of the direction control valve when the operation member is operated so as to rotate to the negative side of the outside of the neutral range,
the current supply section supplies a current to a solenoid of the positive side solenoid proportional pressure reducing valve when the operation member is operated so as to rotate to the positive side, and supplies a current to a solenoid of the negative side solenoid proportional pressure reducing valve when the operation member is operated so as to rotate to the negative side,
the operation intention determining section determines, when the absolute value of the operation speed while the operation member is within the neutral range is larger than the preset value, that there is an intention of operation to the positive side when the operation speed is positive and to the negative side when the operation speed is negative, and
the current control section causes, when it is determined by the operation intention determining section that there is an intention of operation to the positive side or the negative side, the standby current to be supplied from the current supply section to a solenoid of the solenoid proportional pressure reducing valve of a side out of the positive side and the negative side, in a case where that there is at least the intention of operation to the side having being determined.

6. The work machine according to claim 1,
wherein the operation member includes a switch that outputs a first signal that expresses an event of having been gripped when the operation member has been gripped by an operator, and outputs a second signal that expresses an event of having not been gripped when the operation member has not been gripped by the operator, and
the operation intention determining section determines that there is an intention of operating the operation member when the first signal has been outputted from the switch, and determines that there is no intention of operating the operation member when the second signal has been outputted from the switch.

* * * * *